US012720294B2

(12) United States Patent
Poe et al.

(10) Patent No.: US 12,720,294 B2
(45) Date of Patent: Aug. 25, 2026

(54) DEVICE AND METHOD FOR NETWORK SLICE ADMISSION CONTROL

(71) Applicant: HUAWEI TECHNOLOGIES CO., LTD., Shenzhen (CN)

(72) Inventors: Wint Yi Poe, Munich (DE); Riccardo Trivisonno, Munich (DE); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 18/476,522

(22) Filed: Sep. 28, 2023

(65) Prior Publication Data

US 2024/0031790 A1 Jan. 25, 2024

Related U.S. Application Data

(63) Continuation of application No. PCT/CN2021/085133, filed on Apr. 1, 2021.

(51) Int. Cl.
*H04W 8/06* (2009.01)
*H04W 48/08* (2009.01)

(52) U.S. Cl.
CPC ............. *H04W 8/06* (2013.01); *H04W 48/08* (2013.01)

(58) Field of Classification Search
CPC ......... H04M 15/8038; H04M 2215/34; H04M 2215/74–7442; H04W 8/02–30; H04W 24/02; H04W 28/18–26; H04W 48/08; H04W 48/18; H04W 60/00–06
See application file for complete search history.

(56) References Cited

U.S. PATENT DOCUMENTS

| | | | | |
|---|---|---|---|---|
| 9,918,216 | B2 * | 3/2018 | Zhou | H04W 76/12 |
| 10,582,565 | B2 * | 3/2020 | Yang | H04W 76/12 |
| 10,880,747 | B2 * | 12/2020 | Hu | H04L 63/0414 |
| 2019/0261157 | A1 * | 8/2019 | Ramle | H04W 48/18 |
| 2022/0264427 | A1 * | 8/2022 | Ianev | H04W 28/16 |

OTHER PUBLICATIONS

SA WG2 Meeting #140E (e-meeting) S2-2006503 Aug. 19-Sep. 1, 2020; Source: NEC, Title: KI#1 Sol#2: Updates to Solution #2 Max number of UEs per Network Slice control at registration. (Year: 2020).*

(Continued)

*Primary Examiner* — Ronald Eisner
(74) *Attorney, Agent, or Firm* — Fish & Richardson P.C.

(57) ABSTRACT

Example network admission control methods and apparatus are described. In one example method, a first network entity of a first network sends a first request to a second network entity in at least one second network. The first request includes one or more of a request of a proposed adjustment of the at least one roaming budget of at least one roaming related parameter, a request of a new budget of the at least one roaming budget of at least one roaming related parameter, and a request of the admission control of the at least one roaming UE for the at least one network slice. The first network entity receives a first response from the second network entity, wherein the first response indicates whether the second network entity accepts or rejects the proposed adjustment of the at least one roaming budget.

19 Claims, 12 Drawing Sheets

(56) References Cited

OTHER PUBLICATIONS

3GPP TR 23.700-40 V0.4.0 (Jun. 2020) Technical Report 3rd Generation Partnership Project; Technical Specification Group Services and System Aspects; Study on enhancement of network slicing; Phase 2 (Release 17). (Year: 2020).*
3GPP TR 23.700-40 v17.0.0, "3rd Generation Partnership Project; Technical Specification Group Services and System Aspects; Study on enhancement of network slicing; Phase 2 (Release 17)," Mar. 2021, 224 pages.
3GPP TS 23.288 V16.7.0, "3rd Generation Partnership Project; Technical Specification Group Services and System Aspects; Architecture enhancements for 5G System (5GS) to support network data analytics services (Release 16)," Mar. 2021, 66 pages.
NEC, "KI#1 Sol#2: Updates to Solution #2 Max number of UEs per Network Slice control at registration," SA WG2 Meeting #140E (e-meeting), S2-2006503, Ehonia, Aug. 19-Sep. 1, 2020, 5 pages.
3GPP TS 23.501 V16.7.0, "3rd Generation Partnership Project; Technical Specification Group Services and System Aspects; System architecture for the 5G System (5GS); Stage 2(Release 16)," Dec. 2020, 450 pages.
Huawei et al., "KI#2, Sol #7; Updates of Solution #7," 3GPP TSG-WG SA2 Meeting #140E e-meeting, S2-2006507. Elbonia, Aug. 19-Sep. 1, 2020, 7 pages.
3GPP TS 23.502 V16.8.0, "3rd Generation Partnership Project; Technical Specification Group Services and System Aspects; Procedures for the 5G System (5GS); Stage 2 (Release 16)," Mar. 2021, 602 pages.
3GPP TS 23.503 V16.8.0, "3rd Generation Partnership Project; Technical Specification Group Services and System Aspects; Policy and charging control framework for the 5G System (5GS); Stage 2 (Release 16)," Mar. 2021, 115 pages.
3GPP TS 28.531 V16.8.0, "3rd Generation Partnership Project; Technical Specification Group Services and System Aspects; Management and orchestration; Provisioning; (Release 16)," Dec. 2020, 72 pages.
Generic Network Slice Template,Version 4.0,GSM Association, Official Document NG.116—Generic Network Slice Template,Nov. 23, 2020,total 66 pages.
Extended European Search Report in European Appln. No. 21934043.7, mailed on Mar. 25, 2024, 18 pages.
Huawei et al., "KI#2, Sol #7: Updates of Solution #7," 3GPP TSG-WG SA2 Meeting #140E, S2-2006507, e-meeting Elbonia, Aug. 19-Sep. 1, 2020, 7 pages.

* cited by examiner

DEVICE AND METHOD FOR NETWORK SLICE ADMISSION CONTROL

CROSS-REFERENCE TO RELATED APPLICATIONS

This application is a continuation of International Application No. PCT/CN2021/085133, filed on Apr. 1, 2021, the disclosure of which is hereby incorporated by reference in its entirety.

TECHNICAL FIELD

The present disclosure relates generally to the field of wireless communication systems, and particularly to admission control of a network slice. The disclosure proposes an entity and a method for the admission control of a network slice requested from at least one UE. For instance, the entity and method may be used for network slice Service Level Agreement (SLA) control and enforcement of roaming UEs.

BACKGROUND

A network slice refers to a logical network that provides specific network capabilities and network characteristics. In a $5^{th}$ generation mobile network system (5G system), admission control is necessary for a network slice subject to network slice admission control characterized in network slice Service Level Agreement (SLA), and has been studied for specific network slice SLA parameters, for example, a maximum number of allowed UEs in a network slice and a maximum number of allowed Packet Data Unit (PDU) sessions in a network slice.

The Network Slice Admission Control Function (NSACF) monitors the above mentioned slice SLA parameters and controls the slice availability (e.g., the number of registered UEs, or the number of established PDU sessions per network slice) for the network slices that are subject to network slice admission control requirements according to the network slice SLA. A network slice admission control requires during a UE's request for registration, de-registration, re-registration, Network Slice-Specific Authentication and Authorization (NSSAA), PDU session establishment, or PDU session release. If a network slice (i.e., Single Network Slice Selection Assistance Information (S-NSSAI)) is subject to the admission control, each slice SLA parameter of the network slice is associated with the allowed quota or budget values.

For example, S-NSSAI #1 is characterized with a maximum number of allowed registered UEs up to 100,000 UEs and a maximum number of allowed PDU sessions up to 200,000. When a UE request triggers the execution of admission control of S-NSSAI #1, the slice admission control process is handled by NSACF and core network functions (NFs).

The NSACF is defined by the $3^{rd}$ Generation Partnership Project (3GPP) specification TS23.501, together with NFs, e.g., Access and Mobility Management Function (AMF) and checks the status of remaining quota or budget value and decides the acceptance or rejection of the admission control request. In the above-mentioned example, if the registered UEs of a network slice (i.e., S-NSSAI #1) are less than the allowed quota/budget value (i.e., less than 100,000), the NSACF accepts the UE's request for a registration to the network slice (i.e., S-NSSAI #1), and updates the status of remaining quota/budget value (i.e., decrease by one) of the network slice (i.e., S-NSSAI #1). If the registered number of UEs equals the maximum allowed quota/budget value (i.e., 100,000), the NSACF rejects the UE's request for a registration to the network slice (i.e., S-NSSAI #1) by providing the information that the maximum quota/budget has been reached and a back-off timer to be used by the UE to determine when another request can be issued.

However, how to perform the network slice admission control to monitor, manage and enforce a network slice SLA of a network slice subject to admission control requirements for roaming UEs by NSACF is not defined yet.

SUMMARY

In view of the above-mentioned limitations, embodiments of the present disclosure aim to introduce a solution for a network slice subject to network slice admission control requirements, characterized in network slice SLA for roaming UEs in previous, current and/or next generation telecommunication networks. In particular, an objective is to enable a dynamic adjustment or negotiation of a roaming budget (RB) of a slice SLA parameter. One aim is to provide a determination method for a RB adjustment or negotiation based on an intelligent decision. One further objective is to enable network slice admission control check and interaction for the roaming UEs.

The objective is achieved by embodiments as provided in the enclosed independent claims. Advantageous implementations of the embodiments are further defined in the dependent claims.

A first aspect of the disclosure provides a first network entity for a first network for admission control of at least one roaming UE for at least one network slice, wherein each of the at least one network slice is associated with at least one RB allocated to roaming UEs from at least one second network, wherein the first or second network is a mobile communication network, and wherein the first network entity is configured to: send a first request to a second network entity in the at least one second network, wherein the first request comprises one or more of the following: a request of a proposed adjustment of the at least one RB of at least one roaming related parameter, a request of a new budget of the at least one RB of at least one roaming related parameter, and a request of the admission control of the at least one roaming UE for the at least one network slice; and receive a first response from the second network entity, wherein the first response indicates one or more of the following: whether the second network entity accepts or rejects the proposed adjustment of the at least one RB, a new allocated RB of at least one roaming related parameter, and whether the second network entity accepts or rejects the requested admission control of the at least one roaming UE for the at least one network slice.

Embodiments of this disclosure propose an entity for performing a RB adjustment or negotiation to support network slice admission control of roaming UEs and/or network slice admission control check and interaction for the roaming UEs between a first network and a second network. The first network may include a serving Network Operator (i.e., a Visiting Public Land Mobile Network (vPLMN)) and the second network may include a host Network Operator (i.e., a Home Public Land Mobile Network (hPLMN)) of a roaming UE. The first network entity in the first network (i.e., vPLMN) may trigger or request the RB adjustment or negotiation with the associated hPLMN and/or the admission control check of a roaming UE's request to a network slice to the second network entity in the second network (i.e., hPLMN), and may receive a response from the second network entity in the associated hPLMN.

Notably, the service operation <RoamingBudget_Adjustment_Request> may be used to send a proposed adjustment of RB or modify the previous RB with a new RB to hPLMN for its roaming UE(s) at vPLMN. In another case, the service operation <RoamingBudget_Admission_Request> may be used to request of the admission control of at least one Roaming UE of at least one roaming related parameter of the network slice.

In an implementation form of the first aspect, the first network entity is configured to monitor network data and/or UE data indicating the status of the network and/or UE related to the at least one RB of at least one roaming related parameter of the at least one network slice, and determine whether to send the first request to the second network entity in the at least one second network based on the network data and/or the UE data.

Notably, the determination of the RB adjustment or negotiation is based on an intelligent decision provided by the first network entity. The first network entity monitors certain conditions in order to make the decision.

In an implementation form of the first aspect, the monitored network data and/or UE data indicates at least one of: a remaining RB of at least one roaming related parameter of the at least one network slice for the roaming UEs from the second network, a remaining total budget, including a remaining RB of at least one roaming related parameter of the at least one network slice for the roaming UEs from the second network, and a remaining non-roaming budget of the same parameter for non-roaming UEs from the first network, statistical and/or expected behaviors of the roaming UEs in the admission control for the at least one network slice at the first network, statistical and/or expected behaviors of non-roaming UEs in the admission control for the at least one network slice at the first network, and information indicating at least one roaming UE request requires network slice admission control check.

Notable, the monitored network data and/or UE data can be obtained from one or more core network entities, core network functions, and/or management entities of the first network. Further, 3GPP specification, e.g., TS23.502 defines parameters for the expected behaviors of roaming UEs.

In an implementation form of the first aspect, the first request to the second network entity comprises at least one of: an identification of the first network, an identification of the at least one network slice, at least one roaming related parameter of the at least one network slice, an identification of the at least one roaming UE for which the admission control is performed, a proposed RB of the at least one roaming related parameter, statistical and/or expected behaviors of the at least one roaming UE at the first network, an indication of a change in the at least one of the roaming related parameters, an indication to update and/or to obtain the at least one RB of at least one roaming related parameter, and an indication to perform the admission control for the at least one network slice.

If the first network entity decides to negotiate the RB of the network slice with its associated hPLMN, the first network entity triggers the RB adjustment or negotiation request to the hPLMN with at least these parameters from the above-mentioned parameters: an identification of the first network, an identification of the at least one network slice, at least one roaming related parameter of the at least one network slice, a proposed RB of the at least one roaming related parameter, and an indication of a change in the at least one of the roaming related parameters.

If the first network entity decides to request a new RB of the network slice with its associated hPLMN, the first network entity triggers the new RB allocation request to the hPLMN with at least these parameters from the above-mentioned parameters: an identification of the first network, an identification of the at least one network slice, at least one roaming related parameter of the at least one network slice, and an indication to update and/or to obtain the at least one RB of at least one roaming related parameter.

If the first network entity decides to request the admission control of a roaming UE's request to the network slice with its associated hPLMN, the first network entity triggers the network slice admission control request to the hPLMN with at least these parameters from the above-mentioned parameters: an identification of the first network, an identification of the at least one network slice, at least one roaming related parameter of the at least one network slice, an identification of the at least one roaming UE for which the admission control is performed, statistical and/or expected behaviors of the at least one roaming UE at the first network, and an indication to perform the admission control for the at least one network slice.

In an implementation form of the first aspect, when the requested admission control of the at least one roaming UE for the at least one network slice is accepted by the second network entity, the first response from the second network entity comprises at least one of: an identification of the second network, an identification of the at least one network slice, an identification of the at least one roaming UE for which the admission control is performed, at least one roaming related parameter of the at least one network slice, and a new allocated RB of at least one roaming related parameter.

In an implementation form of the first aspect, the first network entity is further configured to: receive a subscription request from the second network entity, wherein the subscription request indicates at least one subscription event; and monitor the at least one subscription event and determine whether to send a notification of the subscription request to the second network entity.

The triggering of the RB adjustment or negotiation between the vPLMN and hPLMN (via the first and second network entities) can be performed in an approach of "Subscribe/Notify". In one case, the service operation <RoamingBudget_Adjustment_Subscribe> is used to subscribe to or modify the previously subscribed event reporting conditions of RB negotiation for its roaming UE(s) at vPLMN. In another case, the service operation <RoamingBudget_Status_Subscribe> is used to subscribe to or modify the previously subscribed event reporting conditions of the status of RB of a roaming related parameter of the network slice.

In an implementation form of the first aspect, the subscription request indicates at least one of: an identification of a second network operator of the second network, an identification of the at least one network slice, an identification of the at least one roaming UE for which the admission control is performed, at least one roaming related parameter of the at least one network slice to be checked, a threshold of the RB of the at least one roaming related parameter, an identification for the subscription, a subscription event for the RB adjustment or negotiation and/or for a status of RB of at least one roaming related parameter of the at least one network slice, subscription event reporting information based on periodically and/or event and/or threshold, and a behavior of the at least one roaming UE at the first network.

In an implementation form of the first aspect, the first network entity is further configured to send the notification of the subscription request to the second network entity based on the monitored at least one subscription event in the first network, wherein the notification comprises one or more of the following: an identification related to the at least one subscription event, time information related to the at least one subscription event, an identification of the first network, an identification of the at least one network slice, at least one roaming related parameter of the at least one network slice, an identification of the at least one roaming UE for which the admission control is performed, a notification message of the event with or without a proposed RB of the at least one roaming related parameter based on the event reporting information in the subscription request, and a notification message of the event with a current status of RB of at least one roaming related parameter of the at least one network slice based on the event reporting information in the subscription request.

Notably, when the subscription event occurs, the provider (e.g., the first network entity) notifies to the consumer (e.g., the second network entity), in one case, the negotiation or adjustment of the RB with or without a new value via the service operation <RoamingBudget_Adjustment_Notify>. In another case, the provider (e.g., the first network entity) notifies to the consumer (e.g., the second network entity) the status of RB of a roaming related parameter of the network slice periodically or threshold based via the service operation <RoamingB udget_Status_Notify>.

In an implementation form of the first aspect, the first network entity is configured to: receive a second request from the second network entity in the at least one second network, wherein the second request is indicative of the proposed adjustment of the at least one RB, and/or of a new allocated RB of the at least one roaming related parameter; and send a second response to the second network entity, wherein the second response indicates one or more of the following: whether the first network entity accepts or rejects the proposed adjustment of at least one RB; a new proposed adjustment of at least one RB of at least one roaming related parameter; and whether the first network entity accepts or rejects the new allocated RB of the at least one roaming related parameter of the at least one network slice.

In particular, the RB adjustment or negotiation and/or of a new allocated RB of the at least one roaming related parameter may also be triggered by the second network entity from the hPLMN. In such case, the second network entity decides and provides a new RB. In one case, the first network entity may accept and send an acknowledgement. In another case, the first network entity will then check the acceptance or rejection of the negotiation request based on the monitoring conditions, e.g., the available resources, expected UEs behaviors, the first network's policy, etc.

In an implementation form of the first aspect, the first network entity is configured to: obtain the RB of the at least one roaming related parameter based on the first response and/or the second request from the second network entity; and configure the RB of the at least one roaming related parameter to a network function of the first network that is responsible for performing the admission control.

If the first network entity decides that the update of RB of the slice SLA parameter of the network slice is required at Core NFs in vPLMN, it sends the updated value to the Core NF in vPLMN that configures the updated RB and the current status of remaining RB. In this case, new roaming UEs' requests for the admission control will be determined based on the updated remaining RB.

In an implementation form of the first aspect, each of the at least one network slice is associated with a set of roaming related parameters, wherein the set of roaming related parameters comprise at least one of: a maximum number of allowed registered roaming UEs from the second network in the network slice of the first network, a maximum number of allowed PDU sessions for roaming UEs from the second network in the network slice of the first network, a maximum and/or minimum number of allowed PDU sessions for each roaming UE from the second network in the network slice of the first network, a maximum and/or minimum number of allowed registered terminals for each roaming UE from the second network in the network slice of the first network, and a minimum uplink or download throughput for at least one roaming UE from the second network in the network slice of the first network.

An initial roaming UEs agreement between the vPLMN and the hPLMN may include, at least, network slice information, and the above-mentioned set of roaming related parameters. Each parameter is associated with a value (i.e., a quota or budget) which is defined as an initial RB.

In an implementation form of the first aspect, the first network entity is configured to receive a configuration message from the second network entity, wherein the configuration message comprises one or more of the following: an identification of the second network, an identification of the at least one network slice, an identification of the at least one roaming UE for which the admission control is performed, and an initial RB of the at least one roaming related parameter of the at least one network slice.

An initial RB can be configured between the vPLMN and the hPLMN via the first network entity and the second network entity for the at least one of the above-mentioned set of roaming related parameters. The first network entity receives the above-mentioned configuration message from the second network entity.

A second aspect of the disclosure provides a second network entity for supporting network slice admission control of a roaming UE for at least one network slice, wherein each of the at least one network slice is associated with at least one RB allocated to roaming UEs from at least one second network, wherein the first or second network is a mobile communication network, and wherein the second network entity is configured to: receive a first request from a first network entity in a first network, wherein the first request comprises one or more of the following: a request of a proposed adjustment of the at least one RB of at least one roaming related parameter, a request of a new budget of the at least one RB of at least one roaming related parameter, and a request of the admission control of the at least one roaming UE for the at least one network slice; and send a first response to the first network entity, wherein the response indicates one or more of the following: whether the second network entity accepts or rejects the proposed adjustment of the at least one RB, a new allocated RB of at least one roaming related parameter, and whether the second network entity accepts or rejects the requested admission control of the at least one roaming UE for the at least one network slice.

Embodiments of this disclosure thus propose an entity for RB adjustment or negotiation to support network slice Admission Control of roaming UEs and/or network slice admission control check and interaction for the roaming UEs between a first network and a second network. As previously described, the first network may include a vPLMN and the second network may include an hPLMN of a roaming UE. The second network entity in the hPLMN may receive a request for the RB adjustment or negotiation from its associated vPLMN, may determine the acceptance or rejection of the received RB adjustment or negotiation request of slice SLA parameter(s) of the network slice, and may respond to the received RB adjustment or negotiation request based on the decision.

Notably, the service operation <RoamingBudget_Adjustment_Request> may be used to send a proposed adjustment of RB or modify the previous RB with a new RB to hPLMN for its roaming UE(s) at vPLMN. In another case, the service operation <RoamingBudget_Admission_Request> may be used to request of the admission control of at least one Roaming UE of at least one roaming related parameter of the network slice.

In an implementation form of the second aspect, the second network entity is further configured to: monitor network data and/or UE data indicating the status of the network and/or UE related to the at least one RB of at least one roaming related parameter of the at least one network slice; and determine whether to send a second request to the first network entity based on the network data and/or the UE data.

In an implementation form of the second aspect, the first request comprises at least one of: an identification of the first network, an identification of the at least one network slice, at least one roaming related parameter of the at least one network slice, an identification of the at least one roaming UE for which the admission control is performed, a proposed RB of the at least one roaming related parameter, statistical and/or expected behaviors of the at least one roaming UE at the first network, an indication of a change in the at least one of the roaming related parameters, an indication to update and/or to obtain the at least one RB of at least one roaming related parameter, and an indication to perform the admission control for the at least one network slice.

If the first network entity decides to negotiate the RB of the network slice with its associated hPLMN, i.e., the second network, the first network entity triggers the RB adjustment or negotiation request to the second network entity with at least these parameters from the above-mentioned parameters: an identification of the first network, an identification of the at least one network slice, at least one roaming related parameter of the at least one network slice, a proposed RB of the at least one roaming related parameter, and an indication of a change in the at least one of the roaming related parameters.

If the first network entity decides to request a new RB of the network slice with its associated hPLMN, the first network entity triggers the new RB allocation request to the hPLMN with at least these parameters from the above-mentioned parameters: an identification of the first network, an identification of the at least one network slice, at least one roaming related parameter of the at least one network slice, and an indication to update and/or to obtain the at least one RB of at least one roaming related parameter.

If the first network entity decides to request the admission control of a roaming UE's request to the network slice with its associated hPLMN, the first network entity triggers the network slice admission control request to the hPLMN with at least these parameters from the above-mentioned parameters: an identification of the first network, an identification of the at least one network slice, at least one roaming related parameter of the at least one network slice, an identification of the at least one roaming UE for which the admission control is performed, statistical and/or expected behaviors of the at least one roaming UE at the first network, and an indication to perform the admission control for the at least one network slice.

In an implementation form of the second aspect, when the requested admission control of the at least one roaming UE for the at least one network slice is accepted by the second network entity, the first response to the first network entity comprises at least one of: an identification of the second network, an identification of the at least one network slice, an identification of the at least one roaming UE for which the admission control is performed, at least one roaming related parameter of the at least one network slice, and a new allocated RB of at least one roaming related parameter.

In an implementation form of the second aspect, the second network entity is further configured to send a subscription request to the first network entity, wherein the subscription request indicates at least one subscription event; and receive a notification of the subscription request from the first network entity, and optionally send a response in response to the notification to the first network entity.

The triggering of the RB adjustment or negotiation between vPLMN and hPLMN (via the first and second network entities) can be performed in an approach of "Subscribe/Notify". In one case, the service operation <RoamingBudget_Adjustment_Subscribe> is used to subscribe to or modify the previously subscribed event reporting conditions of RB negotiation for its roaming UE(s) at vPLMN. When the event occurs, the provider (e.g., the first network entity) notifies to the consumer (e.g., the second network entity) for the negotiation or adjustment of RB with or without a new value via the service operation <RoamingBudget_Adjustment_Notify>. In another case, the service operation <RoamingBudget_Status_Subscribe> is used to subscribe to or modify the previously subscribed event reporting conditions of the status of RB of a roaming related parameter of the network slice.

In an implementation form of the second aspect, the subscription request indicates at least one of: an identification of a second network operator of the second network, an identification of the at least one network slice, an identification of the at least one roaming UE for which the admission control is performed, at least one roaming related parameter of the at least one network slice to be checked, a threshold of the RB of the at least one roaming related parameter, an identification for the subscription, a subscription event for the RB adjustment or negotiation and/or for a status of RB of at least one roaming related parameter of the at least one network slice, subscription event reporting information based on periodically and/or event and/or threshold, and a behavior of the at least one roaming UE at the first network.

In an implementation form of the second aspect, the notification comprises one or more of the following: an identification related to the at least one subscription event, time information related to the at least one subscription event, an identification of the first network, an identification of the at least one network slice, at least one roaming related parameter of the at least one network slice, an identification of the at least one roaming UE for which the admission control is performed, a notification message of the event with or without a proposed RB of the at least one roaming related parameter based on the event reporting information in the subscription request, and a notification message of the event with a current status of RB of at least one roaming related parameter of the at least one network slice based on the event reporting information in the subscription request.

In an implementation form of the second aspect, the second network entity is further configured to: send the second request to the first network entity, wherein the second request is indicative of the proposed adjustment of the at least one RB, and/or of a new allocated RB of the at least one roaming related parameter; and receive a second response from the first network entity, wherein the second response indicates one or more of the following: whether the first network entity accepts or rejects the proposed adjustment of at least one RB; a new proposed adjustment of at least one RB of at least one roaming related parameter; and whether the first network entity accepts or rejects the new allocated RB of the at least one roaming related parameter of the at least one network slice.

In particular, the RB adjustment or negotiation and/or of a new allocated RB of the at least one roaming related parameter may also be triggered by the second network entity from the hPLMN. In such case, the second network entity may monitor network data and/or UE data, and may decide and provide a new RB based on the monitoring conditions. In one case, the first network entity may accept and send an acknowledgement. In another case, the first network entity will check the acceptance or rejection of the negotiation request based on the monitoring conditions, e.g., the available resources, expected UEs behaviors, the first network's policy, etc., and send the second response to inform the second network entity about its decision with or without a new proposal.

In an implementation form of the second aspect, the monitored network data and/or UE data indicates at least one of: a remaining RB of at least one roaming related parameter of the at least one network slice for the roaming UEs from the second network, remaining total budget, including a remaining RB of at least one roaming related parameter of the at least one network slice for the roaming UEs from the second network, and a remaining non-roaming budget of the same parameter for non-roaming UEs from the first network, statistical and/or expected behaviors of the roaming UEs in the admission control for the at least one network slice at the first network, statistical and/or expected behaviors of non-roaming UEs in admission control for at least one network slice at the first network, and information indicating at least one roaming UE request requires network slice admission control check.

Notable, the monitored network data and/or UE data can be obtained from one or more core network entities, core network functions, and/or management entities of the first network. Further, 3GPP specification, e.g., TS23.502 defines parameters for the expected behaviors of roaming UEs.

In an implementation form of the second aspect, each of the at least one network slice is associated with a set of roaming related parameters, wherein the set of roaming related parameters comprise at least one of: a maximum number of allowed registered roaming UEs from the second network in the network slice of the first network, a maximum number of allowed PDU sessions for roaming UEs from the second network in the network slice of the first network, a maximum and/or minimum number of allowed PDU sessions for each roaming UE from the second network in the network slice of the first network, a maximum and/or minimum number of allowed registered terminals for each roaming UE from the second network in the network slice of the first network, and a minimum uplink or download throughput for at least one roaming UE from the second network in the network slice of the first network.

In an implementation form of the second aspect, the second network entity is configured to send a configuration message to the first network entity, wherein the configuration message comprises one or more of the following: an identification of the second network, an identification of the at least one network slice, an identification of the at least one roaming UE for which the admission control is performed, and an initial RB of the at least one roaming related parameter of the at least one network slice.

An initial RB can be configured between the vPLMN and the hPLMN via the first network entity and the second network entity for the at least one of the above-mentioned set of roaming related parameters. The first network entity receives the above-mentioned configuration message from the second network entity.

A third aspect of the disclosure provides a method performed by a first network entity in a first network for admission control of at least one roaming UE for at least one network slice, wherein each of the at least one network slice is associated with at least one RB allocated to roaming UEs from at least one second network, wherein the first or second network is a mobile communication network, and wherein the method comprises: sending a first request to a second network entity in the at least one second network, wherein the first request indicates one or more of the followings: a request of a proposed adjustment of the at least one RB of at least one roaming related parameter, a request of a new budget of the at least one RB of at least one roaming related parameter, and a request of the admission control of the at least one roaming UE for the at least one network slice; and receiving a first response from the second network entity, wherein the first response indicates one or more of the followings: whether the second network entity accepts or rejects the proposed adjustment of the at least one RB, a new allocated RB of at least one roaming related parameter, and whether the second network entity accepts or rejects the requested admission control of the at least one roaming UE for the at least one network slice.

Implementation forms of the method of the third aspect may correspond to the implementation forms of the first network entity of the first aspect described above. The method of the third aspect and its implementation forms achieve the same advantages and effects as described above for the first network entity of the first aspect and its implementation forms.

In an implementation form of the third aspect, the method further comprises monitoring network data and/or UE data indicating the status of the network and/or UE related to the at least one RB of at least one roaming related parameter of the at least one network slice, and determining whether to send the first request to the second network entity in the at least one second network based on the network data and/or the UE data.

Notably, the determination of the RB adjustment or negotiation is based on an intelligent decision provided by the first network entity. The first network entity monitors certain conditions in order to make the decision.

In an implementation form of the third aspect, the monitored network data and/or UE data indicates at least one of: a remaining RB of at least one roaming related parameter of the at least one network slice for the roaming UEs from the second network, a remaining total budget, including a remaining RB of at least one roaming related parameter of the at least one network slice for the roaming UEs from the second network, and a remaining non-roaming budget of the same parameter for non-roaming UEs from the first network, statistical and/or expected behaviors of the roaming UEs in the admission control for the at least one network slice at the first network, statistical and/or expected behaviors of non-roaming UEs in the admission control for the at least one network slice at the first network, and information indicating at least one roaming UE request requires network slice admission control check.

Notable, the monitored network data and/or UE data can be obtained from one or more core network entities, core network functions, and/or management entities of the first network.

In an implementation form of the third aspect, the first request to the second network entity comprises at least one of: an identification of the first network, an identification of the at least one network slice, at least one roaming related parameter of the at least one network slice, an identification of the at least one roaming UE for which the admission control is performed, a proposed RB of the at least one roaming related parameter, statistical and/or expected behaviors of the at least one roaming UE at the first network, an indication of a change in the at least one of the roaming related parameters, an indication to update and/or to obtain the at least one RB of at least one roaming related parameter, and an indication to perform the admission control for the at least one network slice.

If the first network entity decides to negotiate the RB of the network slice with its associated hPLMN, the first network entity triggers the RB adjustment or negotiation request to the hPLMN with at least these parameters from the above-mentioned parameters: an identification of the first network, an identification of the at least one network slice, at least one roaming related parameter of the at least one network slice, a proposed RB of the at least one roaming related parameter, and an indication of a change in the at least one of the roaming related parameters.

If the first network entity decides to request a new RB of the network slice with its associated hPLMN, the first network entity triggers the new RB allocation request to the hPLMN with at least these parameters from the above-mentioned parameters: an identification of the first network, an identification of the at least one network slice, at least one roaming related parameter of the at least one network slice, and an indication to update and/or to obtain the at least one RB of at least one roaming related parameter.

If the first network entity decides to request the admission control of a roaming UE's request to the network slice with its associated hPLMN, the first network entity triggers the network slice admission control request to the hPLMN with at least these parameters from the above-mentioned parameters: an identification of the first network, an identification of the at least one network slice, at least one roaming related parameter of the at least one network slice, an identification of the at least one roaming UE for which the admission control is performed, statistical and/or expected behaviors of the at least one roaming UE at the first network, and an indication to perform the admission control for the at least one network slice.

In an implementation form of the third aspect, when the requested admission control of the at least one roaming UE for the at least one network slice is accepted by the second network entity, the first response from the second network entity comprises at least one of: an identification of the second network, an identification of the at least one network slice, an identification of the at least one roaming UE for which the admission control is performed, at least one roaming related parameter of the at least one network slice, and a new allocated RB of at least one roaming related parameter.

In an implementation form of the third aspect, the method further comprises receiving a subscription request from the second network entity, wherein the subscription request indicates at least one subscription event; and monitoring the at least one subscription event and determining whether to send a notification of the subscription request to the second network entity.

The triggering of the RB adjustment or negotiation between the vPLMN and hPLMN (via the first and second network entities) can be performed in an approach of "Subscribe/Notify". In one case, the service operation <RoamingBudget_Adjustment_Subscribe> is used to subscribe to or modify the previously subscribed event reporting conditions of RB negotiation for its roaming UE(s) at vPLMN. In another case, the service operation <RoamingBudget_Status_Subscribe> is used to subscribe to or modify the previously subscribed event reporting conditions of the status of RB of a roaming related parameter of the network slice.

In an implementation form of the third aspect, the subscription request indicates at least one of: an identification of a second network operator of the second network, an identification of the at least one network slice, an identification of the at least one roaming UE for which the admission control is performed, at least one roaming related parameter of the at least one network slice to be checked, a threshold of the RB of the at least one roaming related parameter, an identification for the subscription, a subscription event for the RB adjustment or negotiation and/or for a status of RB of at least one roaming related parameter of the at least one network slice, subscription event reporting information based on periodically and/or event and/or threshold, and a behavior of the at least one roaming UE at the first network.

In an implementation form of third aspect, the method further comprises sending the notification of the subscription request to the second network entity based on the monitored at least one subscription event in the first network, wherein the notification comprises one or more of the following: an identification related to the at least one subscription event, time information related to the at least one subscription event, an identification of the first network, an identification of the at least one network slice, at least one roaming related parameter of the at least one network slice, an identification of the at least one roaming UE for which the admission control is performed, a notification message of the event with or without a proposed RB of the at least one roaming related parameter based on the event reporting information in the subscription request, and a notification message of the event with a current status of RB of at least one roaming related parameter of the at least one network slice based on the event reporting information in the subscription request.

Notably, when the subscription event occurs, the provider (e.g., the first network entity) notifies to the consumer (e.g., the second network entity), in one case, the negotiation or adjustment of the RB with or without a new value via the service operation <RoamingBudget_Adjustment_Notify>. In another case, the provider (e.g., the first network entity) notifies to the consumer (e.g., the second network entity) the status of RB of a roaming related parameter of the network slice periodically or threshold based via the service operation <RoamingB udget_Status_Notify>.

In an implementation form of the third aspect, the method further comprises receiving a second request from the second network entity in the at least one second network, wherein the second request is indicative of the proposed adjustment of the at least one RB, and/or of a new allocated RB of the at least one roaming related parameter; and sending a second response to the second network entity, wherein the second response indicates one or more of the following: whether the first network entity accepts or rejects the proposed adjustment of at least one RB; a new proposed adjustment of at least one RB of at least one roaming related parameter; and whether the first network entity accepts or rejects the new allocated RB of the at least one roaming related parameter of the at least one network slice.

In particular, the RB adjustment or negotiation and/or of a new allocated RB of the at least one roaming related parameter may also be triggered by the second network entity from the hPLMN. In such case, the second network entity decides and provides a new RB. In one case, the first network entity may accept and send an acknowledgement. In another case, the first network entity will then check the acceptance or rejection of the negotiation request based on the monitoring conditions, e.g., the available resources, expected UEs behaviors, the first network's policy, etc.

In an implementation form of the third aspect, the method further comprises obtaining the RB of the at least one roaming related parameter based on the first response and/or the second request from the second network entity; and configuring the RB of the at least one roaming related parameter to a network function of the first network that is responsible for performing the admission control.

If the first network entity decides that the update of RB of the slice SLA parameter of the network slice is required at Core NFs in vPLMN, it sends the updated value to the Core NF in vPLMN that configures the updated RB and the current status of remaining RB. In this case, new roaming UEs' requests for the admission control will be determined based on the updated remaining RB.

In an implementation form of the third aspect, each of the at least one network slice is associated with a set of roaming related parameters, wherein the set of roaming related parameters comprise at least one of: a maximum number of allowed registered roaming UEs from the second network in the network slice of the first network, a maximum number of allowed PDU sessions for roaming UEs from the second network in the network slice of the first network, a maximum and/or minimum number of allowed PDU sessions for each roaming UE from the second network in the network slice of the first network, a maximum and/or minimum number of allowed registered terminals for each roaming UE from the second network in the network slice of the first network, and a minimum uplink or download throughput for at least one roaming UE from the second network in the network slice of the first network.

An initial roaming UEs agreement between the vPLMN and the hPLMN may include, at least, network slice information, and the above-mentioned set of roaming related parameters. Each parameter is associated with a value (i.e., a quota or budget) which is defined as an initial RB.

In an implementation form of the third aspect, the method further comprises receiving a configuration message from the second network entity, wherein the configuration message comprises one or more of the following: an identification of the second network, an identification of the at least one network slice, an identification of the at least one roaming UE for which the admission control is performed, and an initial RB of the at least one roaming related parameter of the at least one network slice.

An initial RB can be configured between the vPLMN and the hPLMN via the first network entity and the second network entity for the at least one of the above-mentioned set of roaming related parameters. The first network entity receives the above-mentioned configuration message from the second network entity.

A fourth aspect of the disclosure provides a method performed by a second network entity in a second network for admission control of a roaming UE for at least one network slice, wherein each of the at least one network slice is associated with at least one RB allocated to roaming UEs from at least one second network, wherein the first or second network is a mobile communication network, and wherein the method comprises: receiving a first request from a first network entity, wherein the first request indicates one or more of the followings: a request of a proposed adjustment of the at least one RB of at least one roaming related parameter, a request of a new budget of the at least one RB of at least one roaming related parameter, and a request of the admission control of the at least one roaming UE for the at least one network slice; and sending a first response to the first network entity, wherein the response indicates one or more of the followings: whether the second network entity accepts or rejects the proposed adjustment of the at least one RB, a new allocated RB of at least one roaming related parameter, and whether the second network entity accepts or rejects the requested admission control of the at least one roaming UE for the at least one network slice.

Implementation forms of the method of the fourth aspect may correspond to the implementation forms of the second network entity of the second aspect described above. The method of the fourth aspect and its implementation forms achieve the same advantages and effects as described above for the second network entity of the second aspect and its implementation forms.

A fifth aspect of the disclosure provides a first network entity. The first network entity is configured to: receive a second request from the second network entity in the at least one second network, wherein the second request is indicative of the proposed adjustment of the at least one RB, and/or of a new allocated RB of the at least one roaming related parameter; and send a second response to the second network entity, wherein the second response indicates one or more of the following: whether the first network entity accepts or rejects the proposed adjustment of at least one RB; a new proposed adjustment of at least one RB of at least one roaming related parameter; and whether the first network entity accepts or rejects the new allocated RB of the at least one roaming related parameter of the at least one network slice.

A sixth aspect of the disclosure provides a second network entity. The second network entity is further configured to: send the second request to the first network entity, wherein the second request is indicative of the proposed adjustment of the at least one RB, and/or of a new allocated RB of the at least one roaming related parameter; and receive a second response from the first network entity, wherein the second response indicates one or more of the following: whether the first network entity accepts or rejects the proposed adjustment of at least one RB; a new proposed adjustment of at least one RB of at least one roaming related parameter; and whether the first network entity accepts or rejects the new allocated RB of the at least one roaming related parameter of the at least one network slice.

A seventh aspect of the disclosure provides a computer program product comprising a program code for carrying out, when implemented on a processor, the method according to the third aspect and any implementation forms of the third aspect, or the fourth aspect and any implementation forms of the fourth aspect.

It has to be noted that the first network entity is a new network function, or the first network entity is co-located with or part of a network function responsible for performing the network slice admission control or a control plane network function, or is co-located with or part of a management entity.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
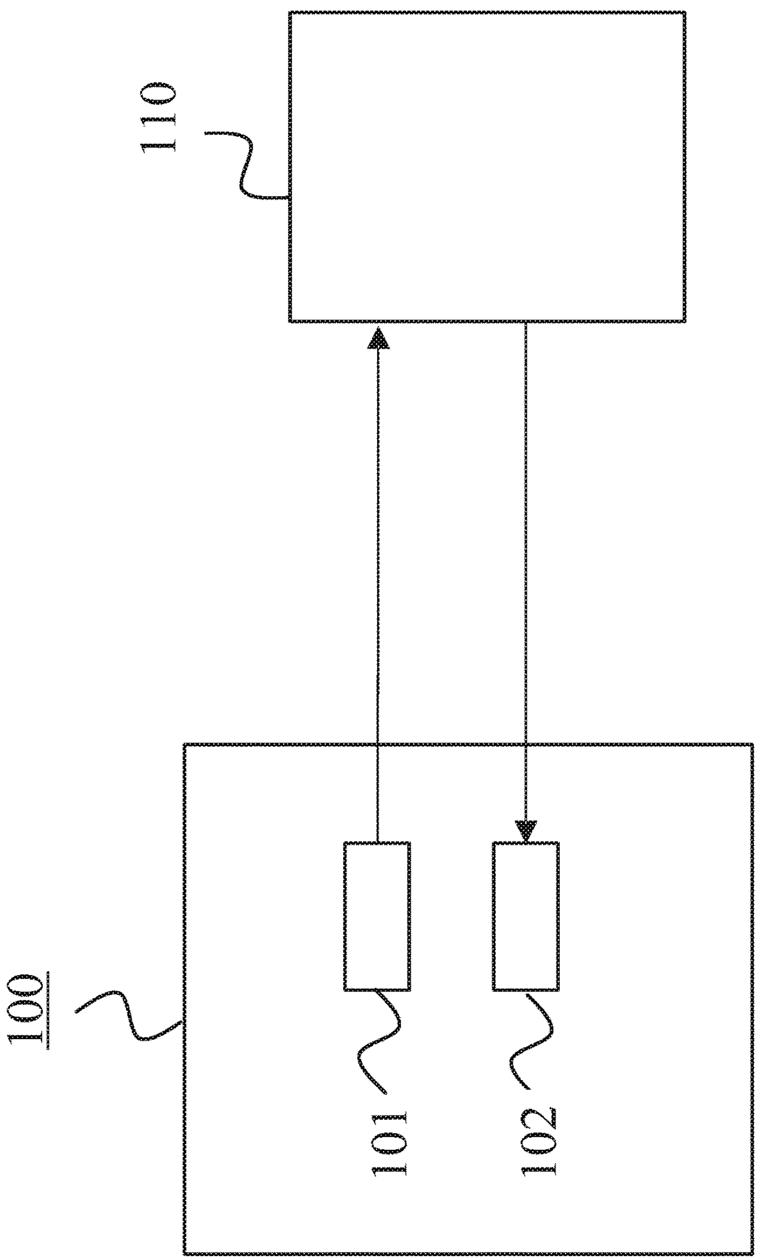
FIG. 1 shows a first network entity according to an embodiment of the disclosure.

Illustrative embodiments of methods and network entities for admission control of roaming UE(s) in a mobile communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Abbreviations and definitions of important terms are first described here.

Network slice: The network slice described in this disclosure can be (i) S-NSSAI defined by 3GPP SA2 concept, or (ii) network slice Instance (NSI) defined by 3GPP SA2/SA5 terminology, or (iii) a combination of S-NSSAI(s) and/or NSI(s) dedicated to a specific customer (e.g., a Vertical Customer). In the following of the disclosure, "S-NSSAI" may be used to refer to "network slice"; it is used as merely as an example but not a limitation.

Slice SLA: The SLA between service/slice provider (e.g., Operator A) and service/slice customer (e.g., Operator B) for a communication service (i.e., Network Slice as a Service (NSaaS) or Communication Service (CS)) of Roaming UEs, in particular, including roaming related Slice SLA parameter (s) with Service Level Objectives (SLO), where the actual SLO will be slice/service specific and will be driven by the service/slice provider and customer (e.g., Operator A and B) and business expectations for the slice/service. The SLO information should include details of how the SLO will be measured including the source for the data.

Roaming agreement: The terminology of Roaming agreement is interchangeable with slice SLA. It is a mutual agreement between vPLMN and hPLMN that includes roaming related parameters and values (i.e., SLO) for a network slice to be supported while a UE is in VPLMN.

Roaming related Slice SLA parameter: Roaming related Generic network Slice Template (GST) attributes defined by GSM Association and/or Roaming related slice related SLA parameter that can characterize a type of network slice.

Quota/Budget: Quota/Budget is the percentage of SLO. The percentage can vary between 0 and 100. The terminology of budget is interchangeable with quota.

Roaming Budget (RB): The Quota or Budget of a slice SLA parameter of a network slice allocated for the roaming UEs of a hPLMN. In roaming, a UE access a vPLMN when leaving their hPLMN. RB is to be agreed between a serving (visiting) Network Operator (i.e., vPLMN) and a host Network Operator (i.e., hPLMN). Roaming quota (RQ) is interchangeable with Roaming budget (RB).Threshold: A threshold is used to define an internal control mechanism and/or a mechanism related to the event reporting and/or the status of the local value of roaming related slice SLA parameter.

Status of RB: It includes the information about the consumed RB and the remaining RB of a slice SLA parameter of a network slice for the roaming UEs of an hPLMN.

Maximum number of allowed registered roaming UEs in a network slice: This parameter defines the maximum number of allowed roaming UEs or terminals supported by a network slice.

Maximum number of allowed PDU sessions for roaming UEs in a network slice: This parameter describes the maximum number of allowed concurrent sessions for roaming UEs supported by the network slice. A concurrent session can be, e.g., a PDU session defined by 3 GPP.

Core NFs: The 3GPP SA2 defined Core Network Functions.

PCF: A Core NF dealing with policy control function (PCF), for example, as defined in 3GPP TS23.501, TS23.502 and TS23.503.

NWDAF: A Core NF dealing with Network Data Analytics Function (NWDAF), for example, as defined in 3GPP TS23.288, TS23.501.

CHF: An entity from OAM dealing with Charging Function (CHF), for example, as defined in 3GPP TS23.501 and TS23.503.

NSACF: A Core NF dealing with network slice admission control function (NSACF), for example, as defined in 3GPP TS23.501 and TS23.502.

For the network slice admission control of roaming UEs, referring to a network slice (i.e., S-NSSAI) with specific slice characteristics related to admission control, Roaming Agreement or slice SLA for Roaming UEs are agreed between a serving Network Operator (i.e., vPLMN) and a host Network Operator (i.e., hPLMN). The initial roaming UEs agreement includes, at least, network slice information, network slice SLA parameters and its associated quota/budget values for roaming UEs of hPLMN, including one or more of:

- Network slice information (e.g., slice type of S-NSSAI),
- Maximum number of allowed roaming UEs (e.g., 100,000 UEs) in a network slice (this parameter is per S-NSSAI per hPLMN),
- Maximum number of allowed PDU sessions for roaming UE(s) (e.g., 200,000 PDU sessions) in a network slice (this parameter is per S-NSSAI per hPLMN),
- Maximum number of allowed PDU sessions for each roaming UE in a network slice (this is per UE per S-NSSAI per hPLMN),
- Maximum number of allowed (registered) terminals/devices for each roaming UE in a network slice (this is per UE per S-NSSAI per hPLMN), and
- Minimum uplink or download throughput for each roaming UE in a network slice (this is per UE per S-NSSAI per hPLMN).

In the above initial Roaming Agreement, each network slice SLA parameter is associated with the values or the quota or the budget which is defined as an initial RB. Based on the Roaming Agreement (with a specific hPLMN), the vPLMN performs the admission control for a network slice (i.e., S-NSSAI) subject to quota admission control against the RB of specific slice SLA parameters. Similar to the admission control process defined by NSACF in 3GPP, the admission control for roaming UEs to the network slice subject to admission control can be performed at vPLMN against the RB of related slice SLA parameter agreed in Roaming Agreement or slice SLA for roaming UEs. In this case, the admission control (e.g., registration or PDU session establishment) of roaming UEs' requests is based on the remaining RB of respective S-NSSAI of respective hPLMN of the UE. If the RB of a slice SLA parameter (e.g., maximum allowed roaming UEs) of a network slice of a respective hPLMN is consumed, the vPLMN will reject the registration requests to the network slice from all roaming UEs of the hPLMN until the budget is available again (e.g., until some roaming UEs deregister the network slice which makes room to accept new UEs).

If roaming UEs' requests are determined against the RB of a slice SLA parameter of S-NSSAI in the initial Roaming Agreement, the visiting PLMN (vPLMN) cannot efficiently utilize the available resources under the following two cases.

- Case 1: For roaming UEs from a specific hPLMN, there is no remaining RB of a slice SLA parameter of a network slice, however, there is room (enough resources) in vPLMN to accept more requests of roaming UEs from a specific hPLMN.
- Case 2: For roaming UEs from a specific hPLMN, the RB of a slice SLA parameter of a network slice has not been reached yet, however, there is no room (not enough resources) in vPLMN to accept more requests of roaming UEs from a specific hPLMN, otherwise the requests of UEs relating to the hPLMN and/or other priority requests would be rejected.

Notably, case 1 may lead to the under-utilization of resources, whereas case 2 may affect the operation of the vPLMN.

As previously mentioned, the functionality to support network slice admission control on slice SLA parameters for Roaming UEs has not been defined in 3GPP Release 17.

In the previous 3GPP releases (e.g., Release 15/16), when a roaming UE requests (e.g., Registration Request) for a set of S-NSSAIs (i.e., requested NSSAI), the network verifies the requested NSSAI (multiple S-NSSAIs) the UE provides in the Registration Request against the Subscription Information. For roaming UEs, the UDM of hPLMN shall provide to the vPLMN only the S-NSSAIs from the Subscribed S-NSSAIs that the hPLMN allows for the UE in the vPLMN. Based on this information, the NSSF in the vPLMN determines the allowed NSSAI (multiple S-NSSAIs) for the roaming UEs to perform the registration procedure without network slice admission control on Slice SLA parameters of a network slice subject to admission control.

If the main functionality of network slice admission control defined by 3GPP Release 17 applied to roaming UEs' admission control in a similar way (although it is not defined in 3GPP Release 17), a serving Network Operator for roaming UEs (i.e., vPLMN) and a host Network Operator of roaming UEs (i.e., hPLMN) must have an agreement (slice SLA or Roaming Agreement). It includes, at least, the RB of a slice SLA parameter (e.g., maximum allowed roaming UEs) of a network slice. However, the admission control based on static configuration of RB will lead to inefficient resource utilization at the vPLMN due to the dynamic requests from the roaming UEs of different hPLMNs to a network slice, subject to different Roaming Agreements (or slice SLAs), as well as the requests from its own UEs to the S-NSSAI. Note that the resource overprovision to overcome this problem cannot eliminate the problem completely.

This disclosure discusses the following two cases of RB definition:

- RB Case 1: RB for the roaming UEs per S-NSSAI is managed and controlled by hPLMN.
- RB Case 2: RB for the roaming UEs per S-NSSAI is managed and controlled by vPLMN.

In both cases, the RB for the roaming UEs per S-NSSAI may or may not be dependent with the global quota of S-NSSAI of hPLMN and vPLMN.

In the first RB case, the hPLMN of the roaming UEs can control and manage the RB budget of the network slice. In this case, the hPLMN may have a better control and management on the adjustment or negotiation of the Roaming Budget for the roaming UEs. An initial RB may be configured between the vPLMN and the hPLMN via the first network entity and the second network entity for the set of roaming related parameters. For example, the initial RB has been consumed and vPLMN may propose a new RB or request an updated RB request to the hPLMN. Based on the status of the remaining global budget of the S-NSSAI, the hPLMN decides and provides an updated RB. The updated RB may or may not be the same if a proposed RB value is included in the request. If no RB value is included in the request, the hPLMN decides to provide an updated value and the vPLMN will check the acceptance or rejection based on the monitoring conditions, e.g., the current remaining global quota, the available resources, expected UEs behaviors, etc.

In the second RB case, the RB for roaming UEs is managed and controlled by vPLMN. In this case, the RB is configured as per slice SLA or Roaming Agreement, the negotiation or adjustment may be triggered by vPLMN based on the monitoring conditions. The status of RB reporting to hPLMN is via the first network entity and the second network entity for the set of roaming related parameters of a network slice.

The roaming UEs request to the vPLMN is subjected to the admission control requirements. The admission control for roaming UEs is subjected to the specific S-NSSAI(s), which is associated with limitations (quota/budget/constraints) on Slice SLA parameters according to the agreement (SLA or Roaming Agreement) between vPLMN and a particular hPLMN. The roaming UEs' request subject to the admission control procedure includes but is not limited to the one or more of the followings:

- Registration to a set of S-NSSAIs, where one or more Allowed S-NSSAI is subjected to admission control
- Re-registration of one or more S-NSSAIs subject to the admission control
- De-registration of one or more S-NSSAIs subject to the admission control
- PDU sessions establishment of a S-NSSAI subject to admission control
- PDU sessions release of a S-NSSAI subject to admission control
- NSSAA for one or more S-NSSAIs subject to the admission control In addition, the admission control of the network slice subject to the admission control shall perform, at least the following system procedures:

- Roaming UEs' Mobility management
- Roaming UEs' control and management for different access types and EPC interworking with 5G or beyond 5G System
- Roaming UEs' charging management Embodiments of this disclosure propose a method of Elastic Quota Management (EQM) for any pair of vPLMN and hPLMN. The EQM functionality is proposed for both vPLMN and hPLMN, to perform the monitoring of the conditions for RB request including the dynamic adjustment or negotiation of the Roaming Budget/Quota, a new RB request, and/or a network slice admission control request of a slice SLA parameter of a network slice (e.g., S-NSSAI) during the roaming UEs' request subject to the admission control procedures, the triggering of the Roaming Budget request to the other PLMN (e.g., vPLMN if EQM in hPLMN triggers the RB adjustment or negotiation, and vice versa), and the determination of the acceptance or rejection of the Roaming Budget request. Based on the monitoring of the conditions for the RB request, the EQM in vPLMN or the EQM in hPLMN can trigger the above mentioned RB requests. In the following, if RB request is for negotiation/adjustment, it refers to the negotiation or adjustment of the RB based on the available resources, roaming UEs behaviors statistics/prediction, or the status of remaining RB (e.g., crossing under/above a threshold). If RB request is for a new RB, it refers to the update of an existing RB with an updated value (i.e., increased or decreased number) and/or a new RB value to be allocated by hPLMN. If RB request is for a network slice admission control, it refers to the network slice admission control (NSAC) of requested network slice(s) by one or more Roaming UEs, where the NSAC check will be performed based on the RB of hPLMN.

The one or more of RB request can be triggered by vPLMN or hPLMN via EQM functionalities and services. For example, the following method includes the functionalities initiated by the EQM in the vPLMN:

EQM Functionalities at a vPLMN:

- Step 1: Monitors and decides the conditions for the above mentioned RB request (e.g., dynamic adjustment or negotiation of the Roaming Budget) of a slice SLA parameter of a network slice.
- Step 2: Triggers (sends) RB request for a slice SLA parameter of a network slice to its associated hPLMN.

EQM Functionalities at a hPLMN:

- Step 3: Determine the acceptance or rejection of the received RB request (e.g., adjustment or negotiation request) of slice SLA parameter(s) of a network slice from its associated vPLMN from step 2.
- Step 4: Responds to the received RB request (e.g., adjustment or negotiation request) based on the decision from step 3.

The proposed EQM functionalities support the admission control of network slice SLA by negotiating the RB, a new RB request and/or a network slice admission control request of a slice SLA parameter of a network slice subject to the admission control with the associated hPLMN. The EQM functionalities can be considered as a part of Admission Control for the roaming UEs, in particular, they handle the adjustment or negotiation of RB that can be used to determine roaming UEs' requests in network slice admission control procedures.

FIG. 1 shows a first network entity 100 according to an embodiment of the disclosure. The first network entity 100 may comprise processing circuitry (not shown) configured to perform, conduct or initiate the various operations of the first network entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors. The first network entity 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network entity 100 to be performed. In one embodiment, the processing circuitry comprises one or more processors and a non-transitory memory connected to the one or more processors. The non-transitory memory may carry executable program code which, when executed by the one or more processors, causes the first network entity 100 to perform, conduct or initiate the operations or methods described herein.

In particular, the first network entity 100 is designed for admission control of at least one roaming UE for at least one network slice at a first network. Each network slice is associated with at least one RB allocated to roaming UEs from at least one second network. In particular, the first or second network is a mobile communication network. For instance, the first network may include a serving Network Operator (i.e., vPLMN) and the second network may include a host Network Operator (i.e., hPLMN). The first network entity 100 may be an EQM entity at the vPLMN, and the second network entity 110 may be an EQM entity at the hPLMN.

In particular, the first network entity 100 is configured to send a first request 101 to a second network entity 110 in the at least one second network. The first request 101 comprises one or more of the following:

a request of a proposed adjustment of the at least one RB of at least one roaming related parameter;

a request of a new budget of the at least one RB of at least one roaming related parameter; and a request of the admission control of the at least one roaming UE for the at least one network slice.

Further, the first network entity 100 is configured to receive a first response 102 from the second network entity 110, wherein the first response 102 indicates one or more of the following:

whether the second network entity 110 accepts or rejects the proposed adjustment of the at least one RB;

a new allocated RB of at least one roaming related parameter; and whether the second network entity 110 accepts or rejects the requested admission control of the at least one roaming UE for the at least one network slice.

Figure 2:
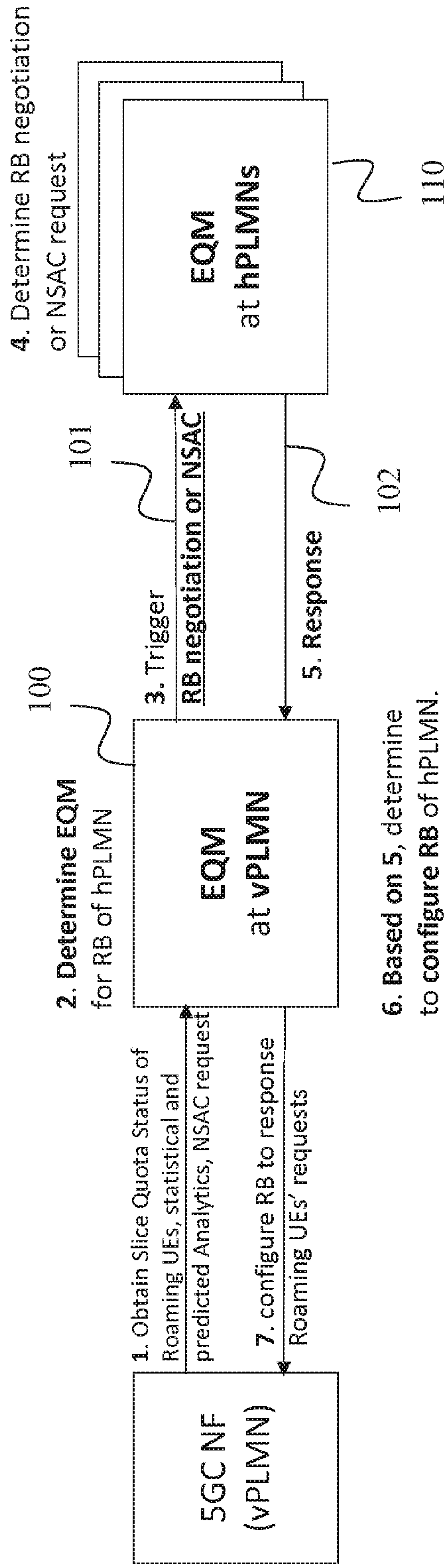
FIG. 2 shows an overview of a method according to an embodiment of the disclosure.

FIG. 2 shows a solution overview of EQM for roaming UEs according to an embodiment of the disclosure. As previously mentioned, the EQM at vPLMN here refers to the first network entity 100 according to embodiments of the disclosure, and the EQM at hPLMN here refers to the second network entity 110 according to embodiments of the disclosure. This also applies to the following figures of this disclosure.

For embodiments of this disclosure, a pre-condition is that the vPLMN receives NSAC request to an S-NSSAI from a roaming UE. If vPLMN manages and controls roaming UEs' requests subject to admission control based on the RB or RB of a slice SLA parameter of S-NSSAI agreed in the (initial) SLA or Roaming Agreement with the associated hPLMN, for the roaming UEs of a particular hPLMN, the status of RB or RB of a slice SLA parameter of the network slice is updated (e.g., decrease by one to RB if the request is accepted) in vPLMN according to the NSAC functionalities. The NSAC functionalities could be as defined in TR23.700-40 and TS23.501 (Release 17) and TS23.502 (Release 17). If hPLMN manages and controls roaming UEs' requests subject to admission control, the vPLMN may send the roaming UE's slice admission control request to the hPLMN.

The following steps are applicable for the RB request of a slice SLA parameter of the network slice subject to admission control. The EQM in vPLMN determines and triggers this RB request, e.g., adjustment or negotiation request with the associated hPLMN.

1. If the RB is available in vPLMN, the EQM in vPLMN obtains input data from Core NFs, including the monitoring information of the status of RB of a slice SLA parameter of the network slice from the Core NF in vPLMN that provides the current status of RB and the monitoring information of statistical and/or predicted Analytics of roaming UEs (including Roaming/Non-roaming UEs behaviors) of the S-NSSAI. The statistical Analytics is an Analytics with the Analytics target period in the past. The predicted Analytics is an Analytics with the Analytics target period in the future. Typically, an Analytics target period is the time interval [start, end], either in the past (both start time and end time in the past) or in the future (both start time and end time in the future). For a roaming UE or a group of roaming UEs, the expected roaming UE behavior related network data analytics is similar to the expected UE behavioral parameters related network data analytics. In this case, Analytics of, for example, UE(s) mobility and/or for UE(s) communication can be enhanced to the roaming UEs of hPLMN with an analytics target period of the statistics or predictions. The EQM may use subscribe/notify services provided by the corresponding Core NF for the event exposure related to the status of RB, the statistical and predicted Analytics data of roaming UEs. The monitoring condition is used to determine the adjustment or negotiation of RB of a slice SLA parameter of a network slice, and the monitoring conditions include but is not limited to the one or more of the followings:

Current remaining budget (or quota) of RB of the network slice of the associated hPLMN, Overall available remaining resource/budget of the network slice of vPLMN (i.e., total remaining budget/resources for all Roaming/Non-roaming UEs allowed to use the S-NSSAI), Statistical roaming UEs behaviors in admission control of the network slice of the associated hPLMN(s), Statistical non-roaming UE behaviors in admission control of the network slice of the vPLMN, Expected roaming UEs behaviors and forecast of the network slice of the associated hPLMN(s), Expected non-roaming UEs behaviors and forecast of the network slice of the vPLMN.

If there is no initial RB in vPLMN, the EQM in the vPLMN may send the roaming UE's request to the hPLMN for network slice admission control (NSAC) check.

2. Based on the (one or more of) information received in step 1, the EQM in vPLMN determines whether the adjustment or negotiation of the RB of a slice SLA parameter of a network slice with the associated hPLMN is needed if the vPLMN manages and controls NSAC based on the available RB. Otherwise, the EQM in vPLMN determines to send the NSAC check to the associated hPLMN.

3. Based on step 2, if EQM decides to negotiate RB or NSAC check of the network slice (S-NSSAI) with its associated hPLMN, EQM triggers RB adjustment or negotiation request to the hPLMN with one or more of the following parameters:

vPLMN ID;

S-NSSAI(s);

UE(s) ID(s);

Slice SLA parameters and new RB values, e.g., Maximum number of allowed registered roaming UEs for the S-NSSAI, new RB value, Max number of PDU session of roaming UE(s) for the S-NSSAI, new RB value;

Statistical and/or expected roaming UEs behaviors at vPLMN;

an indication to update and/or to obtain the at least one roaming budget of at least one roaming related parameter or to perform the admission control for the at least one network slice;

Changes in SLA or Roaming Agreement.

4. The EQM in hPLMN receives the adjustment or negotiation request from the vPLMN and determines the RB adjustment or negotiation or NSAC requests upon one or more of the following parameters:

The statistical behaviors of its roaming UEs at vPLMN;

The expected behaviors of its roaming UEs at vPLMN;

A new RB values and changes in SLA or Roaming Agreement;

A remaining (roaming) budget of the requested network slice from the roaming UE.

5. Based on the decision at step 4, the EQM in hPLMN responds the RB adjustment or negotiation requests to the vPLMN. The response includes the acceptance or rejection of the adjustment or negotiation request or NSAC check. Optionally, if the request is NSAC check, the response may include a new RB value for its roaming UEs in vPLMN that can be sued to control NSAC in vPLMN for other roaming UEs' requests.

Accept/Reject

6. Based on the response from hPLMN, optionally, the EQM in vPLMN determines whether to update the RB of network slice (S-NSSAI) of the associated hPLMN.

7. Optionally, if the update of RB of the slice SLA parameter of the network slice is required, the EQM sends the updated value to the Core NF in vPLMN that keeps the RB (or RB) and the current status of RB (or RB). In this case, new roaming UEs' requests for the admission control will be determined based on the updated remaining quota or budget.

Notably, the EQM in hPLMN may also obtain input data, and use it to determine whether the adjustment or negotiation of RB of a slice SLA parameter is required. In such case, the steps 1 and 2 can be implemented by the EQM in hPLMN. Accordingly, the EQM in hPLMN may trigger the RB negotiation and receive response from the EQM in vPLMN regarding its decision.

Based on above mentioned procedures, according to an embodiment of this disclosure, the first network entity 100 is further configured to: monitor network data and/or UE data indicating the status of the network and/or UE related to the at least one RB; and determine whether to send the first request 101 to the second network entity 110 in the at least one second network based on the network data and/or the UE data.

Optionally, the monitored network data and/or UE data indicates at least one of:

- a remaining RB of at least one roaming related parameter of the at least one network slice for the roaming UEs from the second network,
- a remaining total budget, including a remaining RB of at least one roaming related parameter of the at least one network slice for the roaming UEs from the second network, and a remaining non-roaming budget of the same parameter for non-roaming UEs from the first network,
- statistical and/or expected behaviors of the roaming UEs in the admission control for the at least one network slice at the first network,
- statistical and/or expected behaviors of non-roaming UEs in the admission control for the at least one network slice at the first network, and
- information indicating at least one roaming UE request requires network slice admission control check.

According to an embodiment of this disclosure, the first request 101 to the second network entity 110 in the at least one second network may comprise at least one of:

- an identification of the first network,
- an identification of the at least one network slice,
- at least one roaming related parameter of the at least one network slice,
- an identification of the at least one roaming UE for which the admission control is performed,
- a proposed RB of the at least one roaming related parameter,
- statistical and/or expected behaviors of the at least one roaming UE at the first network,
- an indication of a change in the at least one of the roaming related parameters,
- an indication to update and/or to obtain the at least one RB of at least one roaming related parameter, and
- an indication to perform the admission control for the at least one network slice.

When the requested admission control of the at least one roaming UE for the at least one network slice is accepted by the second network entity 110, the first response 102 from the second network entity 110 may comprise at least one of:

- an identification of the second network,
- an identification of the at least one network slice,
- an identification of the at least one roaming UE for which the admission control is performed,
- at least one roaming related parameter of the at least one network slice, and
- a new allocated RB of at least one roaming related parameter.

Figure 3:
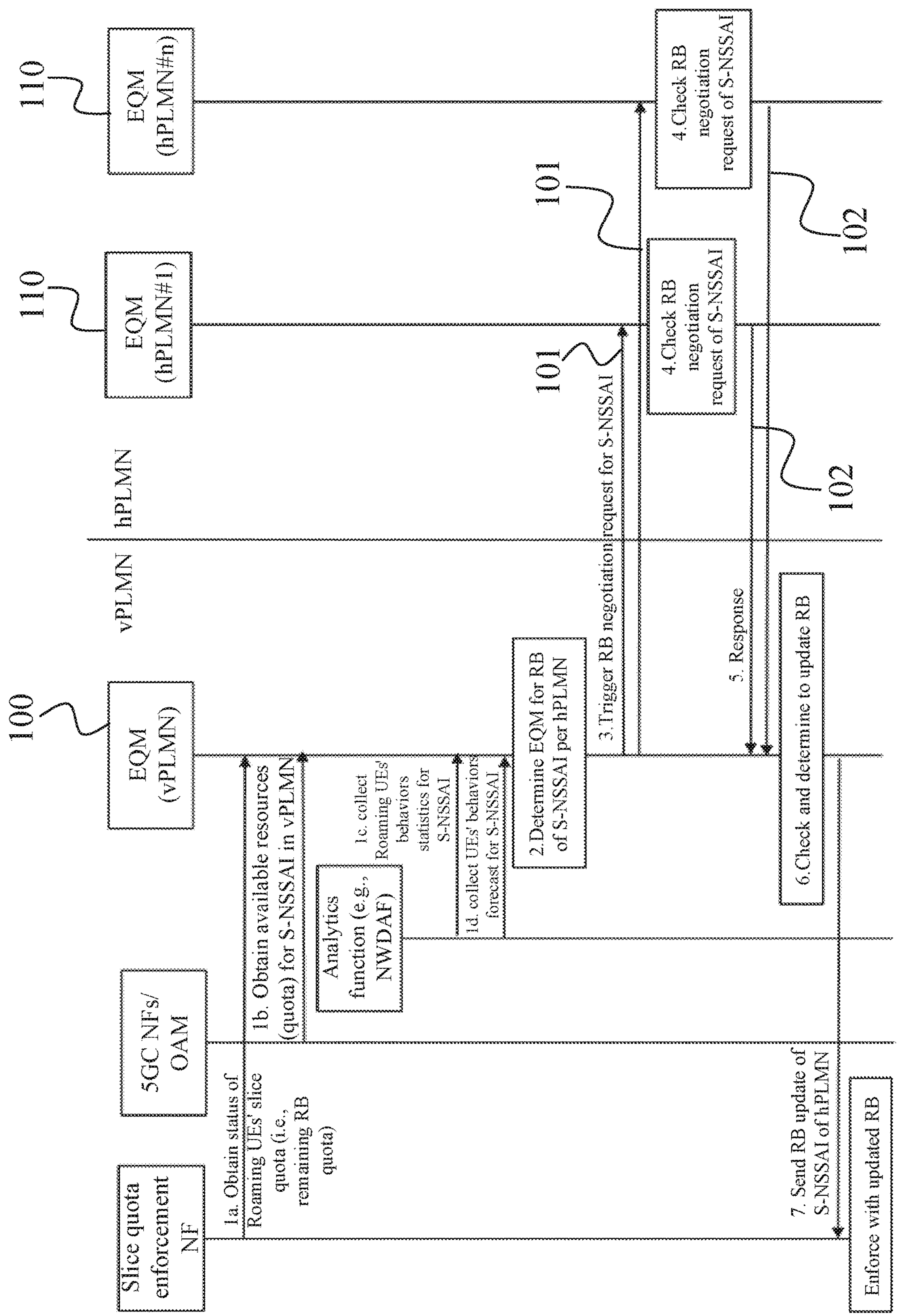
FIG. 3 shows a communication procedure between a first network and a second network according to an embodiment of the disclosure.

FIG. 3 depicts a detailed procedure of EQMs for roaming UEs. In particular, the steps 1-7 from the solution overview of FIG. 2 are covered in the detailed procedures of EQM.

It should be noted that in step 3, the vPLMN may trigger the RB adjustment request of a slice SLA parameter of S-NSSAI with the corresponding hPLMN without a new RB value, for example, in case of the initial RB is about to consumed or under or above the thresholds has been reached or the maximum RB value has been consumed. In this case, in step 4, the EQM in hPLMN will check and decide whether a new RB value (a lower/higher RB) can be provided based on the status of global quota of S-NSSAI, (e.g., including non-roaming UEs or only roaming UEs). If a new RB can be adjusted, it will be included in the response of step 5.

As previously mentioned, EQM in hPLMN can also trigger RB negotiation or adjustment request with the EQM in vPLMN. Although FIG. 3 shows that the EQM in vPLMN collects network data and/or UE data (as shown in step 1a-1d of FIG. 3), these steps can also the EQM in hPLMN.

To support EQM functionalities in the admission control of roaming UEs, the following EQM services are defined in Table 1. The following EQM services are provided by the EQM entity or a network entity with supported EQM functionalities.

TABLE 1

EQM services

| Service Name | Service Operations | Operation Semantics | Example Consumer(s) |
|---|---|---|---|
| RoamingBudget_ Adjustment | Subscribe Unsubscribe Notify | Subscribe/ Notify | NF dedicated to NSACF or CHF or PCF or NWDAF co-located with EQM or new Core NF dedicated for EQM functionalities in hPLMN/vPLMN |
| | Request | Request/ Response | NF dedicated to NSACF or CHF or PCF or NWDAF co-located with EQM or new Core NF dedicated for EQM functionalities in vPLMN/hPLMN |

TABLE 1-continued

| EQM services | | | |
|---|---|---|---|
| Service Name | Service Operations | Operation Semantics | Example Consumer(s) |
| | Response | Request/ Response | NF dedicated to NSACF or CHF or PCF or NWDAF co-located with EQM or new Core NF dedicated for EQM functionalities in vPLMN/hPLMN |
| | Update | Request/ Response | NF dedicated to NSACF, OAM entity, CHF and/or other Core NFs |
| RoamingBudget_ Status | Subscribe Unsubscribe Notify | Subscribe/ Notify | NF dedicated to NSACF or CHF or PCF or NWDAF co-located with EQM or new Core NF dedicated for EQM functionalities in hPLMN/vPLMN |
| RoamingBudget_ Admission | Request | Request/ Response | NF dedicated to NSACF or CHF or PCF or NWDAF co-located with EQM or new Core NF dedicated for EQM functionalities in vPLMN/hPLMN |

The NF, responsible for network slice Admission Control in vPLMN executes the network slice Admission Control upon roaming UEs requests (e.g., UE registrations or PDU session establishments) to a network slice subject to quota admission limit. The EQM or Core NF having the proposed EQM functionalities collects the status of RB of associated slice SLA parameter(s) of the network slice periodically or event based (e.g., when RB exceed a threshold). Together with the other network resource information collected from other Core NFs or OAM and statistical and expected UE behaviors information collected from Analytics functions (e.g., NWDAF), the EQM determines the triggering of adjustment or negotiation with the associated hPLMN.

The triggering of RB adjustment or negotiation between vPLMN and hPLMN (via EQM) can be performed in two approaches.

1. Subscribe/Notify
2. Request/Response

In the first case, the consumer (e.g., EQM in hPLMN) uses the service operation <RoamingBudget_Adjustment_Subscribe> to subscribe to or modify event reporting of Roaming Budget Negotiation for its roaming UE(s) at vPLMN. The input for the subscription includes one or more of the following information: S-NSSAI, UE(s) ID, hPLMN ID, slice SLA parameter to be checked and negotiated, Notification Target Address and Event Reporting Information (e.g., thresholds of RB or UE behaviors to trigger negotiation). When the event occurs, the provider (e.g., EQM in vPLMN) notifies to the consumer (e.g., EQM in hPLMN) for the negotiation or adjustment of RB with or without a new value via the service operation <RoamingBudget_Adjustment_Notify>.

Additionally, the service operation <RoamingBudget_Status_Subscribe> may be used to subscribe to or modify the previously subscribed event reporting conditions of the current status of RB of a roaming related parameter of the network slice. A notification message of the event with the current status of RB of at least one roaming related parameter of the at least one network slice will be notified via the service operation <RoamingBudget_Status_Subscribe> by the provider (e.g., EQM in vPLMN) to the consumer (e.g., EQM in hPLMN) based on event reporting information in the subscription request.

Figure 4:
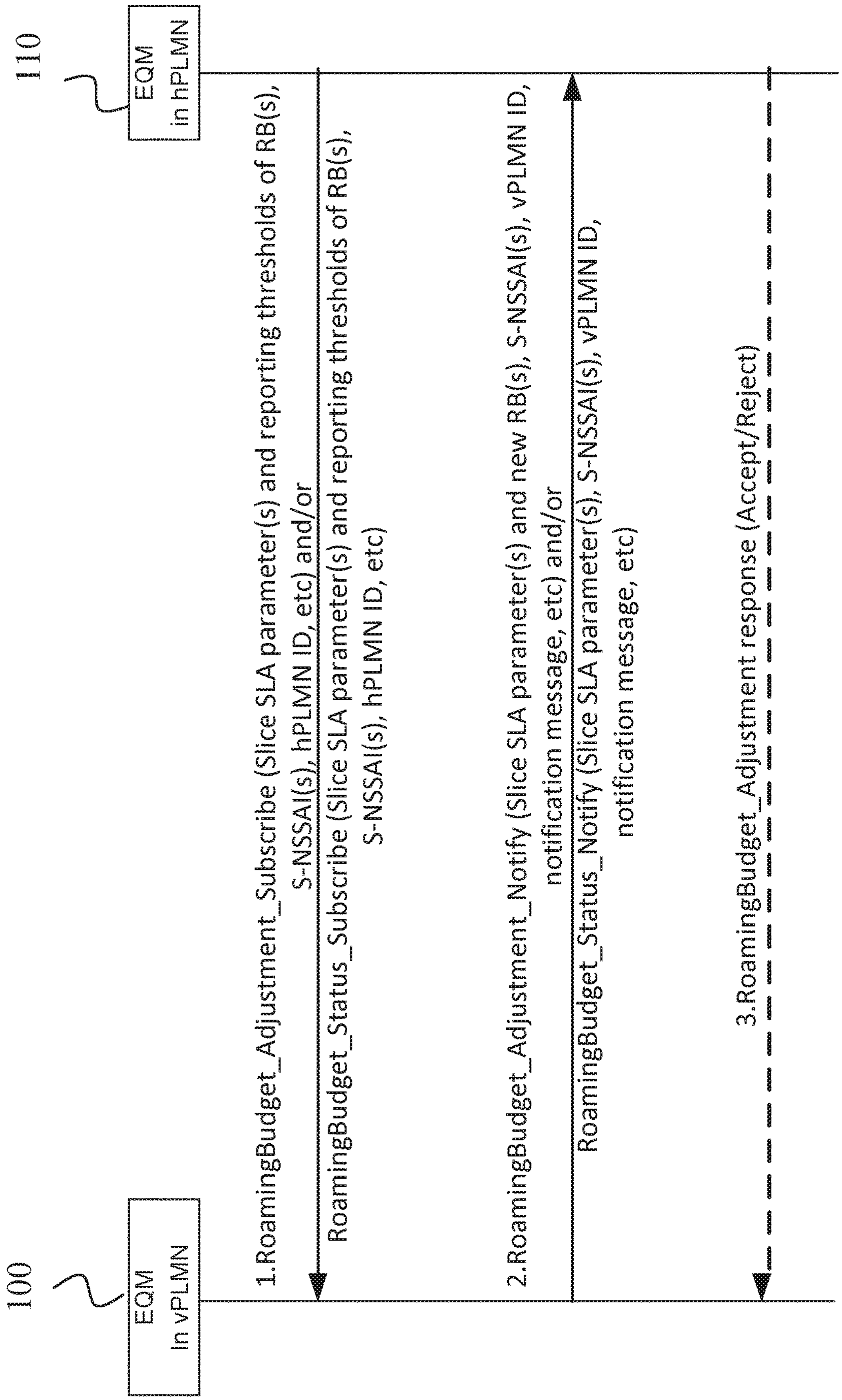
FIG. 4 shows a first approach for triggering RB adjustment according to an embodiment of the disclosure.

The call flow for subscribe/notify service operations are presented in FIG. 4. According to an embodiment of this disclosure, the first network entity 100 may be configured to: receive a subscription request from the second network entity 110, wherein the subscription request indicates at least one subscription event; and monitor the at least one subscription event and determine whether to send a notification of the subscription request to the second network entity 110.

Accordingly, the first network entity 100 may be configured to send the notification of the subscription request to the second network entity 110 based on the monitored at least one subscription event in the first network. In particular, the notification may comprise one or more of the following:

- an identification related to the at least one subscription event,
- time information related to the at least one subscription event;
- an identification of the first network,
- an identification of the at least one network slice,
- at least one roaming related parameter of the at least one network slice,
- an identification of the at least one roaming UE for which the admission control is performed,
- a notification message of the event with or without a proposed RB of the at least one roaming related parameter based on event reporting information in the subscription request, and
- a notification message of the event with the current status of RB of at least one roaming related parameter of the at least one network slice based on event reporting information in the subscription request.

Optionally, the subscription request may indicate at least one of:

- an identification of a second network operator of the second network,
- an identification of the at least one network slice,
- an identification of the at least one roaming UE for which the admission control is performed,
- at least one roaming related parameter of the at least one network slice to be checked,
- a threshold of the RB of the at least one roaming related parameter,
- an identification for the subscription, a subscription event for the RB adjustment or negotiation and/or for the status of RB of at least one roaming related parameter of the at least one network slice, subscription event reporting information based on periodically and/or event and/or threshold, and a behavior of the at least one roaming UE at the first network.

It may be worth mentioning that the consumer of subscribe/unsubscribe service operations are supported by EQM (i.e., the NF dedicated to NSACF or CHF or PCF or NWDAF co-located with EQM or new Core NF dedicated for EQM functionalities in hPLMN/vPLMN).

In the second case, the EQM in vPLMN determines and triggers the Roaming Budget Negotiation with the associated hPLMN (via its EQM) using the service operation <RoamingBudget_Adjustment_Request> or <RoamingBudget_Admission_Request>. The inputs parameters are described at the step 3 of the solution overview of FIG. 2. The triggering of RB admission between vPLMN and hPLMN (via EQM) can also be performed via the service operation <RoamingBudget_Admission_Request>, for example, NSAC check is controlled and managed by hPLMN after checking the slice availability check (e.g., resource availability check) at vPLMN for a roaming UE request subject to NSAC.

Figure 5:
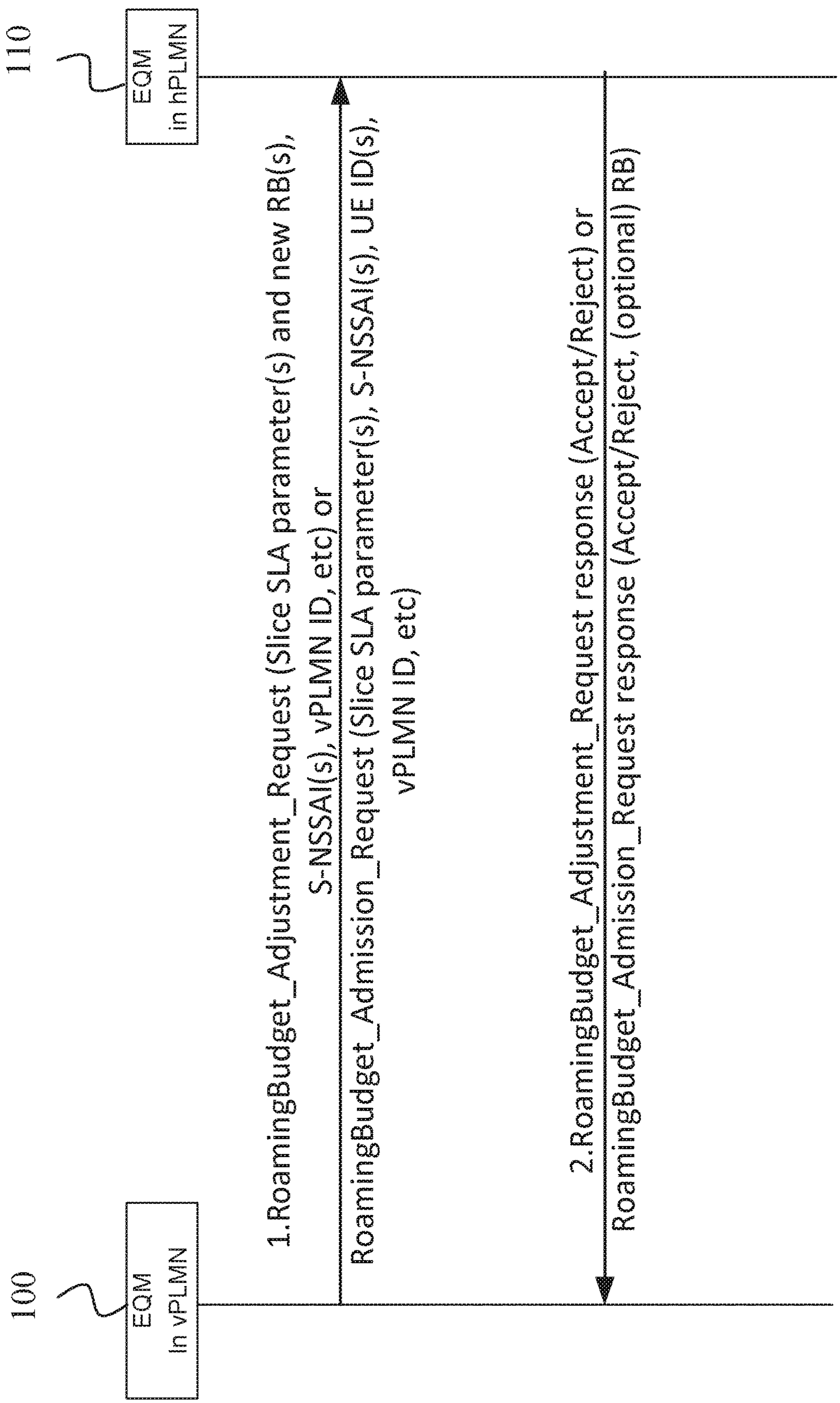
FIG. 5 shows a second approach for triggering RB adjustment according to an embodiment of the disclosure.

The call flow for request/response service operations are presented in FIG. 5. It may be worth mentioning that the request/response service operations are supported by EQM (i.e., the NF dedicated to NSACF or CHF or PCF or NWDAF co-located with EQM or new NF dedicated for EQM functionalities in hPLMN/vPLMN).

Figure 6:
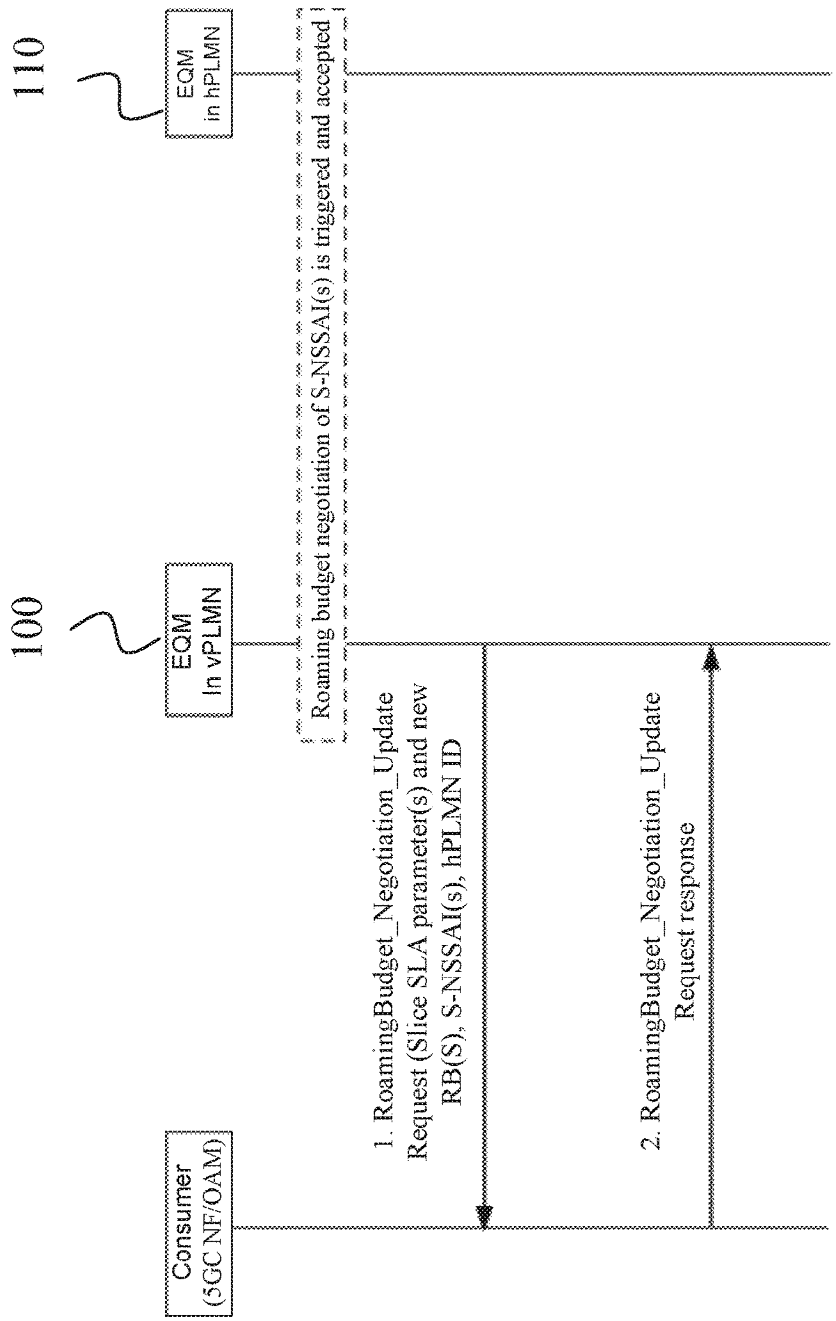
FIG. 6 shows an approach for updating RB according to an embodiment of the disclosure.

According to an embodiment of this disclosure, the update of RB adjustment or negotiation between vPLMN and hPLMN (via EQM) can be performed by using "Request/Response". The call flow of the update of the negotiated RB value is illustrated in FIG. 6.

Optionally, the negotiated RB value can be updated at vPLMN after the acceptance of adjustment or negotiation request from hPLMN (via EQM) using the service operation <RoamingBudget_Adjustment_Update>. The request is triggered by the EQM to update the new value of RB of particular Slice SLA parameter(s) of the network slice to the NF dedicated for the network slice Admission Control functionalities for the handling of another roaming UEs' requests from the hPLMN. Optionally, the update request may also be sent to the required Core NFs or OAM in vPLMN based on the management and business requirements. The request includes slice SLA parameter(s) and new RB values, the information of the network slice, the information of hPLMN.

According to an embodiment of this disclosure, the first network entity 100 is further configured to obtain the RB of the at least one roaming related parameter based on the first response 102 and/or the second request from the second network entity 110; and configure the RB of the at least one roaming related parameter to a network function of the first network that is responsible for performing the admission control.

Optionally, the first network entity 100 may be further configured to receive a configuration message from the second network entity 110, wherein the configuration message comprises one or more of the following:

an identification of the second network, an identification of the at least one network slice, an identification of the at least one roaming UE for which the admission control is performed, and an initial RB of the at least one roaming related parameter of the at least one network slice.

Figure 7:
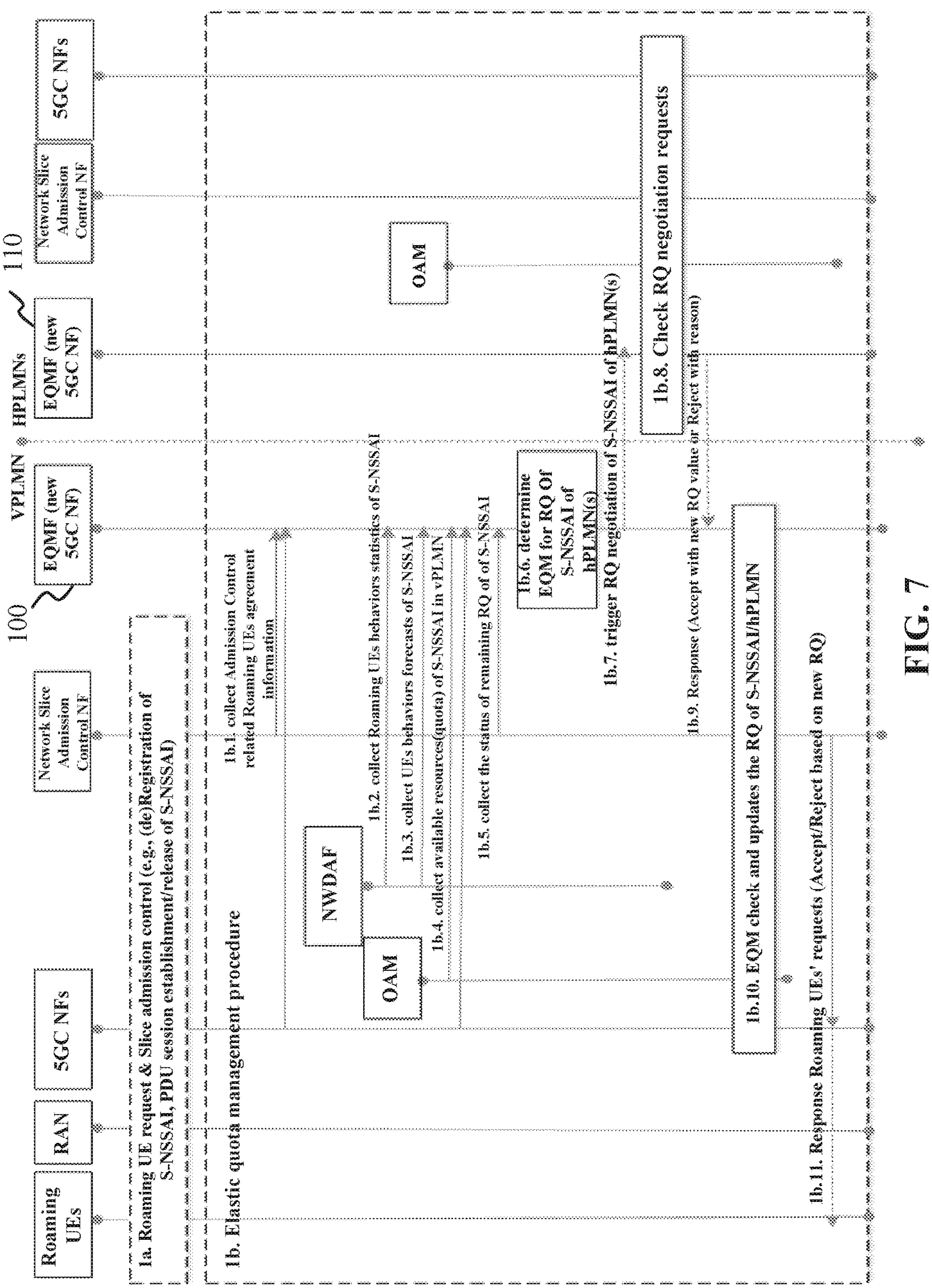
FIG. 7 shows a first network entity as a standalone Core NF according to an embodiment of the disclosure.

According to a particular embodiment of this disclosure, EQM may exist as a new entity with a new interface and new message exchange for Roaming Budget adjustment or negotiation as presented in FIG. 7.

Step 1a. The roaming UEs' requests subject to admission control (e.g., registration to a set of S-NSSAI, PDU sessions establishment of a network slice) are managed and enforced by the serving PLMN (i.e., vPLMN) according to the network slice admission control functionalities concluded in 3GPP TR 23.700-40 against the initial RB of the associated slice SLA parameters of the associated S-NSSAI from the corresponding hPLMN.

Step 1b. In parallel with network slice admission control operation in core network, the elastic quota management functionalities can be performed by a new entity of new NF, e.g., EQM Function (EQMF) for a network slice associated with roaming UEs of the corresponding hPLMN. The new entity, EQMF, exists in all PLMN to support roaming UEs' Budget or Quota adjustment or negotiation. Each EQMF pair (between vPLMN and hPLMN) communicates and exchange messages via a new interface.

Step 1b.1. The EQMF in vPLMN obtains information related to the Roaming Budget of slice SLA parameters of the network slice of the associated hPLMN included in the initial Roaming Agreement or SLA between vPLMN and hPLMN. The EQMF can get this information from one of the Core NFs and/or the NF dedicated for the network slice Admission Control functionalities.

Step 1b.2. The EQMF in vPLMN obtains information related to the statistical Analytics data of Roaming/Non-roaming UEs related to the S-NSSAI, including one or more of the followings:

Statistical behaviors of roaming UEs in admission control procedure (e.g., registration, session management, mobility) with respect to the network slice of the associated hPLMN(s) from Analytics function (e.g., NWDAF, MDAF), Statistical behaviors of non-roaming UEs in admission control procedure (e.g., registration, session management, mobility) with respect to the network slice of the vPLMN from Analytics function (e.g., NWDAF, MDAF).

Step 1b.3. The EQMF in vPLMN obtains information related to the expected/predicted Analytics data of Roaming/Non-roaming UEs related to the S-NSSAI, including one or more of the followings:

Expected behaviors and forecast of roaming UEs in admission control procedure (e.g., registration, session management, mobility) with respect to the network slice of the associated hPLMN(s) from Analytics function (e.g., NWDAF), Expected behaviors and forecast of Non-roaming UEs in admission control procedure (e.g., registration, session management, mobility) with respect to the network slice of the vPLMN(s) from Analytics function (e.g., NWDAF).

Step 1b.4. The EQMF in vPLMN obtains information related to the resources of S-NSSAI from other NFs, including one or more of the followings:

Overall available remaining resource of the network slice in vPLMN from Core NFs and/or OAM, Step 1b.5. The EQMF obtains in vPLMN obtains information related to the admission control of S-NSSAI from Core NFs, including one or more of the followings:

The current remaining RB (or quota) of RB of slice SLA parameters of the network slice of the associated hPLMN from network slice Admission Control NF, Overall available remaining budget of slice SLA parameters of the network slice of vPLMN (i.e., total remaining budget for all Roaming/Non-roaming UEs allow to use the S-NSSAI) from network slice Admission Control NF.

Step 1b.6. Based on the (one or more of) information received in step 1b.1-1b.5, the EQMF in vPLMN determines whether the adjustment or negotiation of the RB of a slice SLA parameter of a network slice with the associated hPLMN is needed or not. If EQMF determines a new RB value of a slice SLA parameter should be negotiated, the EQMF triggers the RB adjustment or negotiation of the network slice with the associated hPLMN.

Step 1b.7. The EQMF in vPLMN triggers RB/RB adjustment or negotiation request to the EQMF in hPLMN with one or more of the parameters as previously described in step 3 of FIG. 2.

Step 1b.8. The EQMF in hPLMN receives the adjustment or negotiation request from the EQMF in vPLMN and determines the RB adjustment or negotiation requests based on one or more of the following information available in hPLMN.

The statistical behaviors of its roaming UEs requests to the network slice related to the Admission control procedures at vPLMN;

The expected behaviors of its roaming UEs requests to the network slice related to the Admission control procedures at vPLMN;

A new RB value(s);

Information related to the changes in SLA or Roaming Agreement in coordination with other Core NFs and/or OAM.

Optionally, the EQMF in hPLMN will coordinate with the 5G or beyond 5G System entity and OAM for further decision.

Step 1b.9. Based on the decision at step 1b.8, the EQMF in hPLMN responds the RB adjustment negotiation requests to the EQMF in vPLMN. The response includes the acceptance or rejection of the adjustment or negotiation request.

Accept/Reject

Step 1b.10. Based on the response received from the EQMF of the hPLMN, the EQMF in vPLMN checks the response and determines whether to update the RB of the network slice of the associated hPLMN. If the corresponding update of an RB of a slice SLA parameter is required, the EQM sends the updated value of the RB(s) of particular Slice SLA parameter(s) of the network slice to the NF dedicated for the network slice Admission Control functionalities for the handling of roaming UEs of the hPLMN. The update may also be sent to the required Core NFs or OAM in vPLMN based on the management and business requirements.

Step 1b.11. Based on the updates at step 1b.10, the NF dedicated for the network slice admission control functionalities update the remaining quota or budget and new roaming UEs' requests for the admission control will be handled and determined the acceptance or rejection of the requests based on the updated remaining quota or budget.

According to another embodiment of the disclosure, the EQM functionalities may be co-located with an existing NF dedicated to the network slice Admission Control functionalities. In particular, the network entity triggering and adjustment or negotiation of EQM functionalities is the existing NF dedicated to the network slice Admission Control functionalities in vPLMN and hPLMN as presented in FIG. 8. Based on the current 3GPP ongoing work, this NF can be a new NF and/or can be core NF (e.g., NSACF). In this embodiment, the EQM co-located with an existing NF dedicated to the network slice Admission Control functionalities may use an existing interface or a new interface between two PLMNs with a new message exchange for Roaming Budge adjustment or negotiation.

Apart from co-location of EQM at the existing NF, the procedure for the Roaming Budget adjustment or negotiation is the same as steps 1b.1-1b.11 from the previous embodiment as shown in FIG. 7.

For the NSAC check, a particular embodiment of this disclosure follows the following steps:

Step 1c.1. The EQM in vPLMN obtains the roaming UEs' requests subject to admission control (e.g., registration to a set of S-NSSAI, PDU sessions establishment of a network slice).

Step 1c.2. The EQM in vPLMN determines whether to check NSAC in vPLMN if the RB is available in vPLMN. Otherwise, the EQM in vPLMN performs the availability check (e.g., resource availability) in VPLMN before it interacts with the EQM in HPLMN. If the availability check is successful, the EQM in vPLMN sends NSAC check to the associated hPLMN of the roaming UE for the requested S-NSSAI.

Step 1c.3. The EQM in vPLMN triggers RB request of NSAC check of S-NSSAI to the EQM in hPLMN(s). The request includes one or more of the parameters described in step 3 of FIG. 2.

Step 1c.4. The EQM in vPLMN check the NSAC request from the EQM in vPLMN based on the current remaining roaming budget of the requested network slice by the Roaming UE. If the maximum limit of the RB or the global quota (in case RB is part of the global quota) has not been reached, the EQM in hPLMN accepts the NSAC request with optionally a new allocated RB of the S-NSSAI which can allow the NSAC check at vPLMN for upcoming roaming UE requests. Otherwise, the NSAC request will be rejected with a reason (e.g., the max. limit has been reached).

Step 1c.5. The EQM in hPLMN responds (Accept with/without new RB value or Reject with reason) to the EQM in vPLMN.

Step 1c.6. The EQM in vPLMN checks the response and configures the RB of S-NSSAI for the associated hPLMN if a new RB is allocated.

Step 1c.7. The response to the Roaming UEs' requests (Accept/Reject) are sent to the other Core NF based on the response from step 1c.5.

Figure 8:
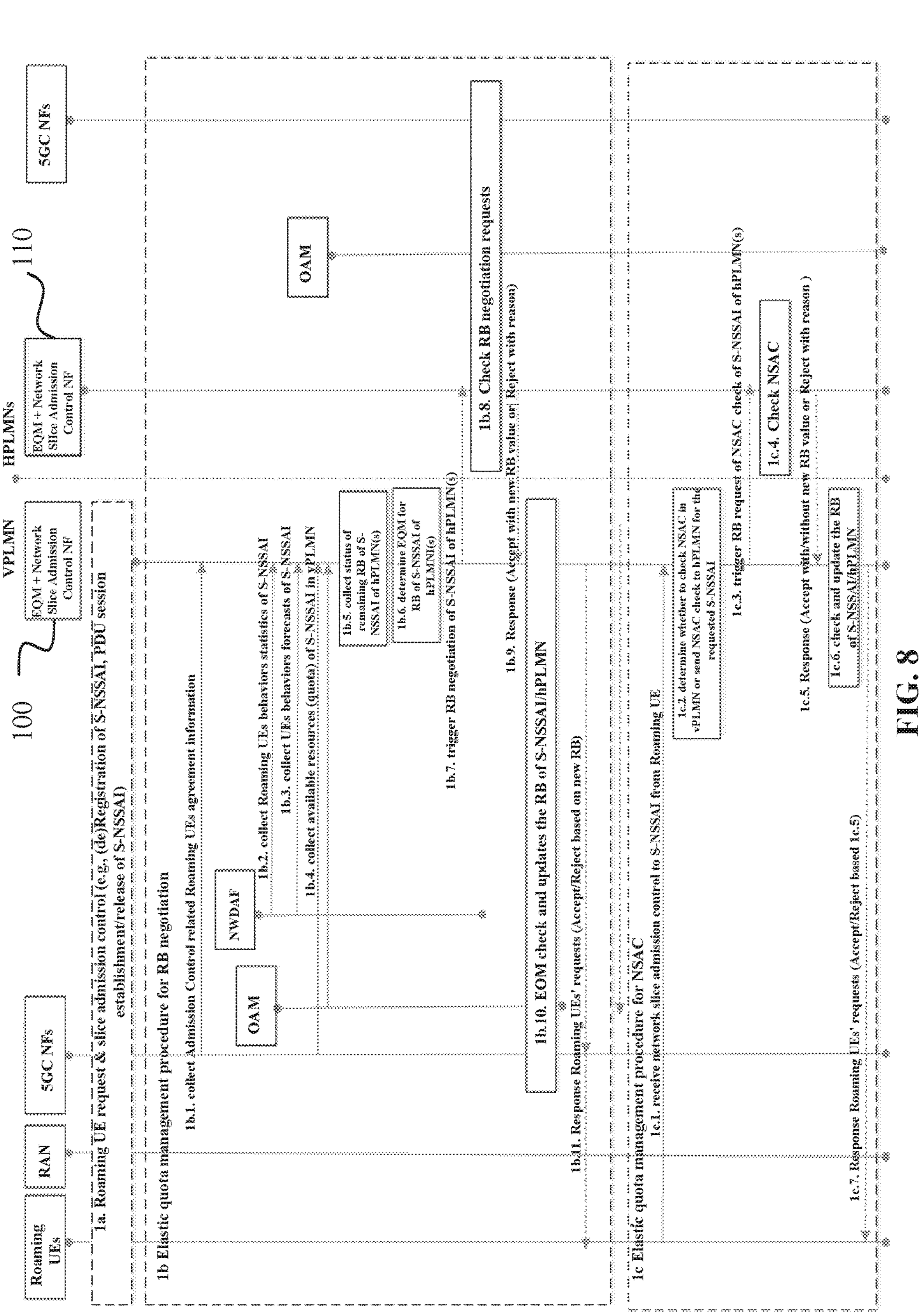
FIG. 8 shows a first network entity that is co-located with Core NF according to an embodiment of the disclosure.
Figure 9:
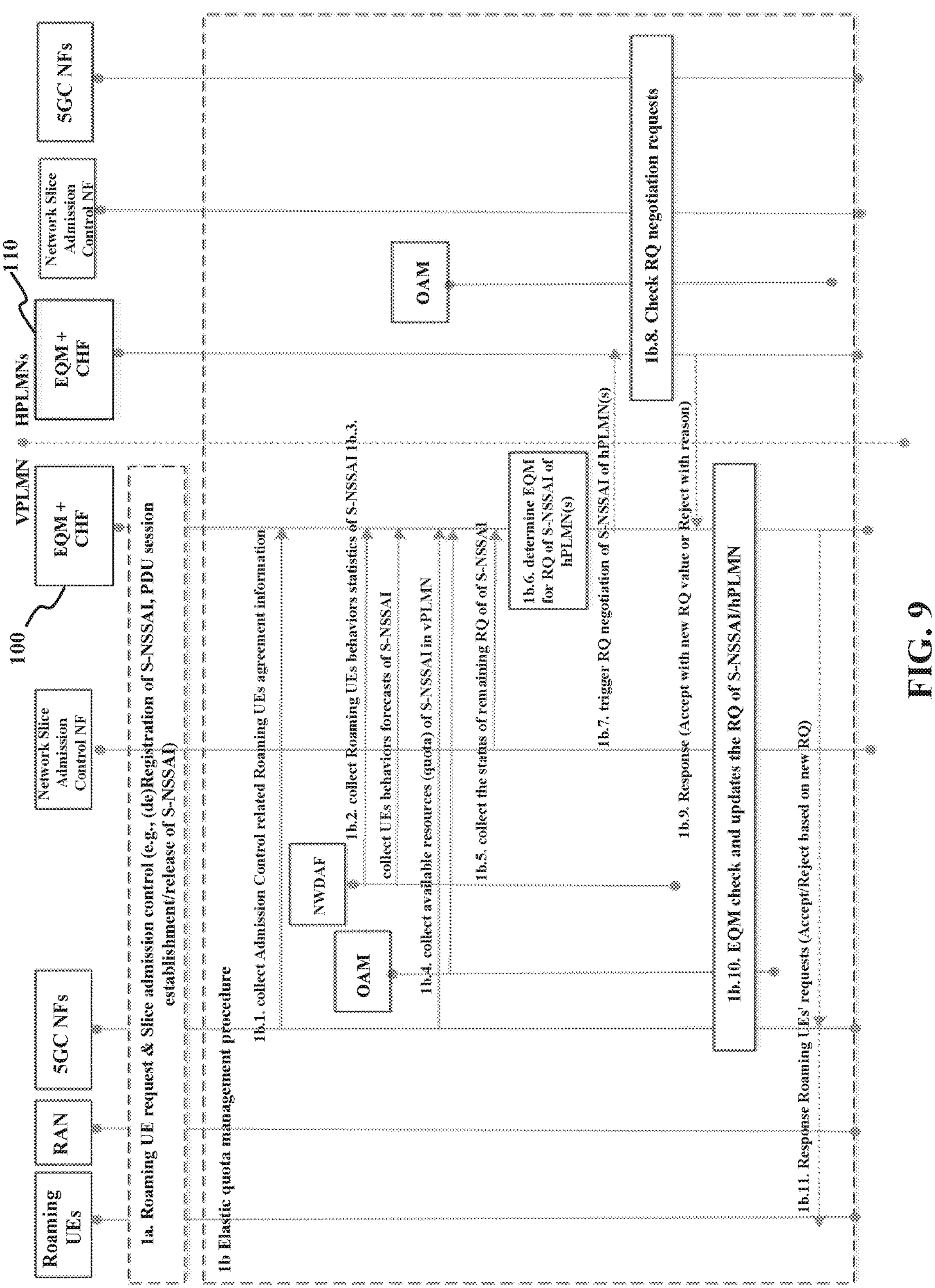
FIG. 9 shows a first network entity that is co-located with OAM entity according to an embodiment of the disclosure.

In another embodiment of this disclosure, the EQM functionalities may be co-located with OAM entity, e.g., charging function (CHF). In particular, the network entity triggering and adjustment or negotiation of EQM functionalities is the CHF entities in both vPLMN and hPLMN as presented in FIG. 9. In this embodiment, the EQM co-located with CHF may use an existing interface or a new interface between two PLMNs with a new message exchange for Roaming Budget adjustment or negotiation. Apart from the co-location of EQM at the OAM entity, CHF, the procedure is the same as previous embodiment as shown in FIG. 7 or FIG. 8.

Figure 10:
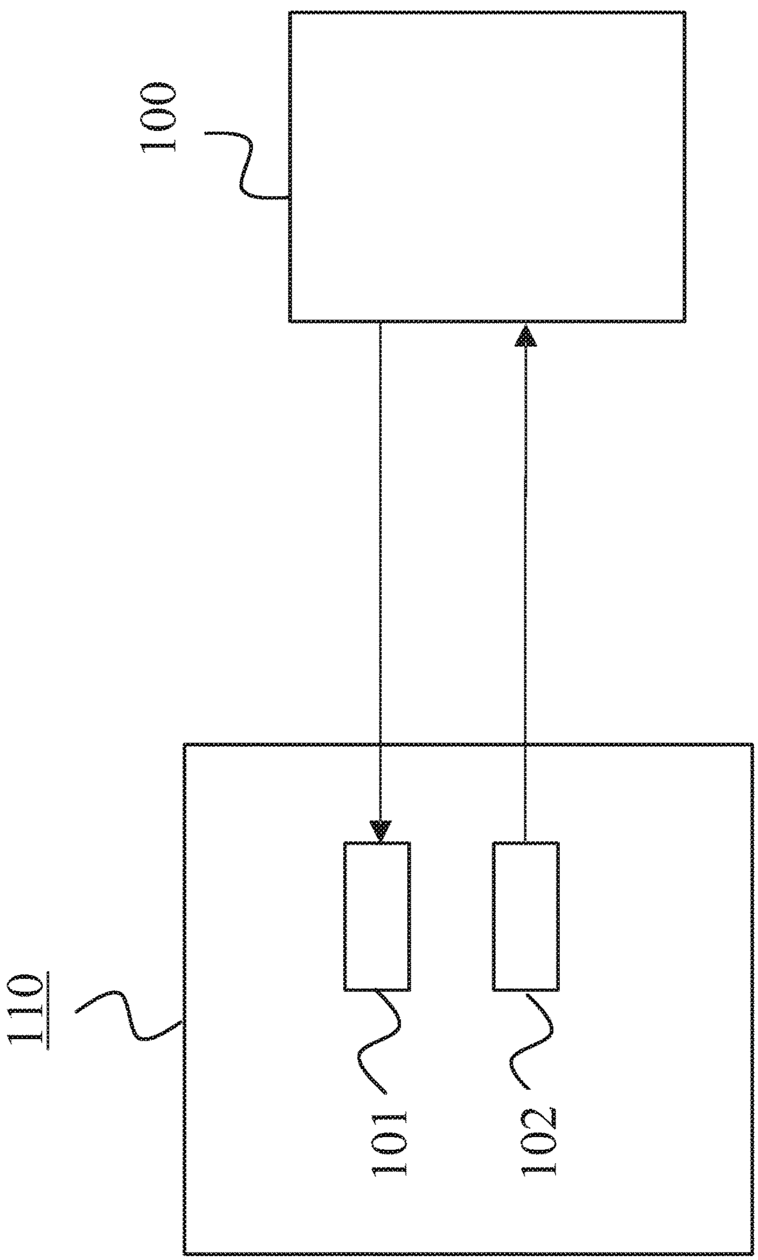
FIG. 10 shows a second network entity according to an embodiment of the disclosure.

FIG. 10 shows a second network entity 110 for a second network according to an embodiment of the disclosure. The second network entity 110 may comprise processing circuitry (not shown) configured to perform, conduct or initiate the various operations of the second network entity 110 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors. The second network entity 110 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the second network entity 110 to be performed. In one embodiment, the processing circuitry comprises one or more processors and a non-transitory memory connected to the one or more processors. The non-transitory memory may carry executable program code which, when executed by the one or more processors, causes the second network entity 110 to perform, conduct or initiate the operations or methods described herein.

In particular, the second network entity 110 is for supporting network slice admission control of a roaming UE for at least one network slice. Notably, each of the at least one network slice is associated with at least one RB allocated to roaming UEs from at least one second network. The first or second network is a mobile communication network.

In particular, the second network entity 110 is configured to receive a first request 101 from a first network entity 100 in a first network. The first request 101 comprises one or more of the following:

- a request of a proposed adjustment of the at least one RB of at least one roaming related parameter;
- a request of a new budget of the at least one RB of at least one roaming related parameter;
- a request of the admission control of the at least one roaming UE for the at least one network slice.

The second network entity 110 is further configured to send a first response 102 to the first network entity 100, wherein the response indicates one or more of the following:

- whether the second network entity 110 accepts or rejects the proposed adjustment;
- a new allocated RB of at least one roaming related parameter; and
- whether the second network entity 110 accepts or rejects the requested admission control of the at least one roaming UE for the at least one network slice.

As previously described, embodiments of this disclosure provide an EQM entity for Roaming Budget adjustment or negotiation to support network slice Admission Control of roaming UEs' between vPLMN and hPLMNs. The second network entity 110 here refers to the EQM entity of hPLMN. Notably, the second network entity 110 shown in FIG. 10 may be the second network entity shown in FIG. 1. The first network entity 100 shown in FIG. 10 may be the first network entity shown in FIG. 1. That is, the second network entity 110 may operate accordingly as described in the previous embodiments referring to the first network entity 100.

Optionally, the first request 101 comprises at least one of:

- an identification of the first network,
- an identification of the at least one network slice,
- at least one roaming related parameter of the at least one network slice,
- an identification of the at least one roaming UE for which the admission control is performed,
- a proposed RB of at least one roaming related parameter,
- statistical and/or expected behaviors of the at least one roaming UE at the first network, and
- an indication of a change in the at least one of the roaming related parameters,
- an indication to update and/or to obtain the at least one RB of at least one roaming related parameter, and
- an indication to perform the admission control for the at least one network slice.

When the requested admission control of the at least one roaming UE for the at least one network slice is accepted by the second network entity 110, the first response 102 to the first network entity 100 may comprise at least one of:

- an identification of the second network,
- an identification of the at least one network slice,
- an identification of the at least one roaming UE for which the admission control is performed,
- at least one roaming related parameter of the at least one network slice, and
- a new allocated RB of at least one roaming related parameter.

According to an embodiment of the disclosure, the second network entity 110 may be further configured to: send a subscription request to the first network entity 100, wherein the subscription request indicates at least one subscription event; and receive a notification of the subscription request from the first network entity 100. Optionally, the second network entity 110 may be further configured to send a response in response to the notification to the first network entity 100.

Optionally, the subscription request indicates at least one of:

- an identification of a second network operator of the second network,
- an identification of the at least one network slice,
- an identification of the at least one roaming UE for which the admission control is performed,
- at least one roaming related parameter of the at least one network slice to be checked,
- a threshold of the RB of the at least one roaming related parameter,
- an identification for the subscription,
- a subscription event for the RB adjustment or negotiation and/or for a status of RB of at least one roaming related parameter of the at least one network slice,
- subscription event reporting information based on periodically and/or event and/or threshold, and
- a behavior of the at least one roaming UE at the first network. Optionally, the notification comprises one or more of the following:
- an identification related to the at least one subscription event,
- time information related to the at least one subscription event;
- an identification of the first network,
- an identification of the at least one network slice,
- at least one roaming related parameter of the at least one network slice,
- an identification of the at least one roaming UE for which the admission control is performed, and
- a notification message of the event with or without a proposed roaming budget of the at least one roaming related parameter based on the event reporting information in the subscription request, and
- a notification message of the event with a current status of RB of at least one roaming related parameter of the at least one network slice based on the event reporting information in the subscription request.

According to an embodiment of the disclosure, the second network entity 110 may be further configured to monitor network data and/or UE data indicating the status of the network and/or UE related to the at least one RB; and determine whether to send a second request to the first network entity 100 based on the network data and/or the UE data.

Optionally, the second network entity 110 may be further configured to: send the second request to the first network entity 100 for triggering the sending of the request, wherein the second request is indicative of the proposed adjustment of the at least one RB, and/or of a new allocated RB of the at least one roaming related parameter; and receive a second response from the first network entity 100, wherein the second response indicates one or more of the following:

- whether the first network entity 100 accepts or rejects the proposed adjustment of at least one RB;
- a new proposed adjustment of at least one RB of at least one roaming related parameter; and
- whether the first network entity 100 accepts or rejects the new allocated RB of the at least one roaming related parameter of the at least one network slice.

In particular, the monitored network data and/or UE data may indicate at least one of:

- a remaining RB of at least one roaming related parameter of the at least one network slice for the roaming UEs from the second network,
- a remaining total budget, including a remaining RB of at least one roaming related parameter of the at least one network slice for the roaming UEs from the second network, and a remaining non-roaming budget of the same parameter for non-roaming UEs from the first network,
- statistical and/or expected behaviors of the roaming UEs in the admission control for the at least one network slice at the first network, and
- statistical and/or expected behaviors of non-roaming UEs in admission control for at least one network slice at the first network, and
- information indicating at least one roaming UE request requires network slice admission control check.

According to an embodiment of the disclosure, the second network entity 110 may be further configured to send a configuration message to the first network entity 100. In particular, the configuration message comprises one or more of the following:

- an identification of the second network,
- an identification of the at least one network slice,
- an identification of the at least one roaming UE for which the admission control is performed, and
- an initial RB of the at least one roaming related parameter of the at least one network slice.

Figure 11:
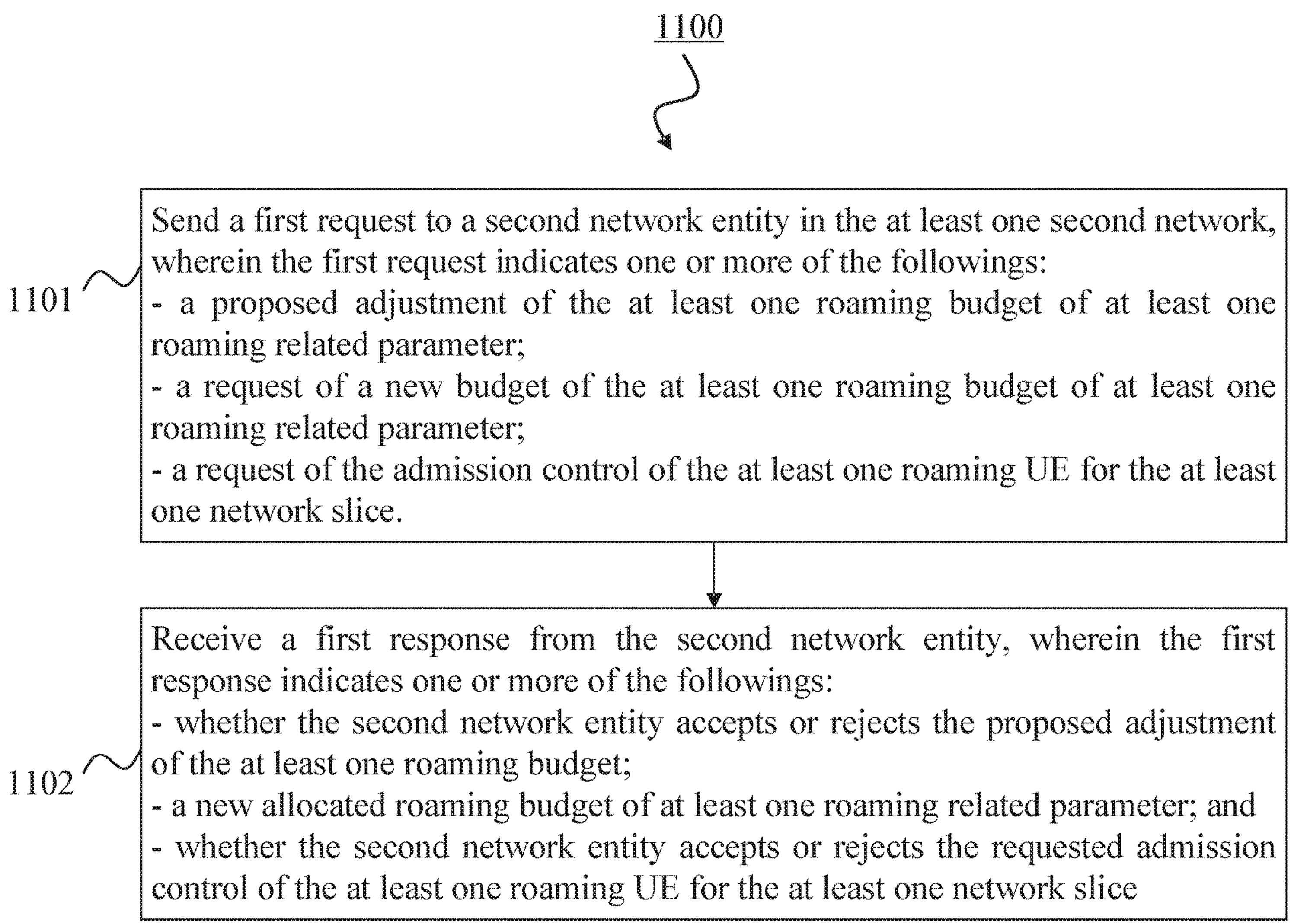
FIG. 11 shows a method according to an embodiment of the disclosure.

FIG. 11 shows a method 1100 according to an embodiment of the disclosure. In a particular embodiment of the disclosure, the method 1100 is performed by a first network entity 100 shown in FIG. 1. The method 1100 comprises: a step 1101 of sending a first request 101 to a second network entity 110 in the at least one second network. In particular, the first request 101 indicates one or more of the followings:

- a request of a proposed adjustment of the at least one RB of at least one roaming related parameter;
- a request of a new budget of the at least one RB of at least one roaming related parameter;
- a request of the admission control of the at least one roaming UE for the at least one network slice.

The method 1100 further comprises a step 1102 of receiving a first response 102 from the second network entity 110. In particular, the first response 102 indicates one or more of the followings:

- whether the second network entity 110 accepts or rejects the proposed adjustment of the at least one RB;
- a new allocated RB of at least one roaming related parameter; and
- whether the second network entity 110 accepts or rejects the requested admission control of the at least one roaming UE for the at least one network slice.

Possibly, the second network entity 110 is the second network entity shown in FIG. 1 or FIG. 10.

Figure 12:
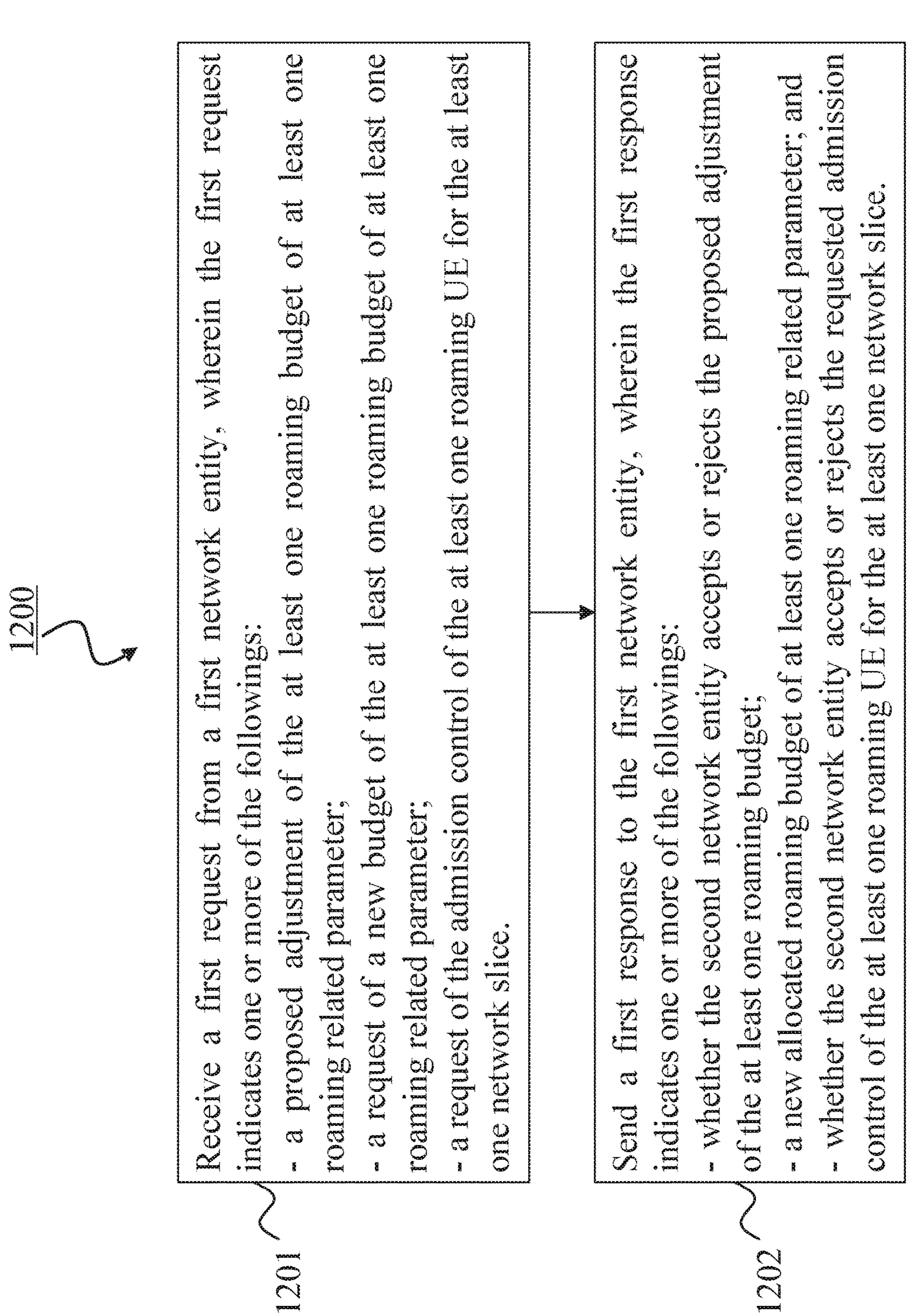
FIG. 12 shows a method according to an embodiment of the disclosure.

FIG. 12 shows a method 1200 according to an embodiment of the disclosure. In a particular embodiment of the disclosure, the method 1200 is performed by a second network entity 110 shown in FIG. 1 or FIG. 10. The method 1200 comprises: a step 1201 of receiving a first request 101 from a first network entity 100. In particular, the first request 101 indicates one or more of the followings:

- a request of a proposed adjustment of the at least one RB of at least one roaming related parameter;
- a request of a new budget of the at least one RB of at least one roaming related parameter;
- a request of the admission control of the at least one roaming UE for the at least one network slice.

The method 1200 further comprises a step 1202 of sending a first response 102 to the first network entity 100. In particular, the first response 102 indicates one or more of the followings:

- whether the second network entity 110 accepts or rejects the proposed adjustment;
- a new allocated RB of at least one roaming related parameter; and
- whether the second network entity 110 accepts or rejects the requested admission control of the at least one roaming UE for the at least one network slice.

Possibly, the first network entity 100 is the first network entity shown in FIG. 1 or FIG. 10.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network entity 100 and the second network entity 110, respectively, comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the first network entity 100 and the second network entity 110, respectively, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

The invention claimed is:

1. A first network node in a first network for admission control of at least one roaming user equipment (UE) for at least one network slice, wherein each of the at least one network slice is associated with at least one roaming budget allocated to roaming UEs from at least one second network, wherein the first network or the at least one second network is a mobile communication network, wherein the first network node comprises at least one processor and one or more memories coupled to the at least one processor, and wherein the one or more memories store programming instructions for execution by the at least one processor to:

send a first request to a second network node while the first network node is roaming to or located in the at least one second network, wherein the first request comprises one or more of the following:

a request for a proposed adjustment of the at least one roaming budget of at least one roaming related parameter;

a request for a new budget of the at least one roaming budget of at least one roaming related parameter; or a request for the admission control of the at least one roaming UE for the at least one network slice;

receive a first response from the second network node, wherein the first response indicates one or more of the following:

whether the second network node accepts or rejects the proposed adjustment of the at least one roaming budget;

a new allocated roaming budget of at least one roaming related parameter; or whether the second network node accepts or rejects the requested admission control of the at least one roaming UE for the at least one network slice; and wherein the one or more memories store the programming instructions for execution by the at least one processor to:

monitor at least one of network data or UE data indicating a status of at least one of a network or UE related to the at least one roaming budget; and determine whether to send the first request to the second network node while the first network node is roaming to or located in the at least one second network based on at least one of the network data or the UE data.

2. The first network node according to claim 1, wherein at least one of the monitored network data or UE data indicates at least one of:

a remaining roaming budget of at least one roaming related parameter of the at least one network slice for the roaming UEs from the second network, a remaining total budget, including a remaining roaming budget of at least one roaming related parameter of the at least one network slice for the roaming UEs from the second network, and a remaining non-roaming budget of the same parameter for non-roaming UEs from the first network, at least one of statistical or expected behaviors of the roaming UEs in the admission control for the at least one network slice at the first network, at least one of statistical or expected behaviors of non-roaming UEs in the admission control for the at least one network slice at the first network, or information indicating that at least one roaming UE request requires network slice admission control check.

3. The first network node according to claim 1, wherein the first request to the second network node while the first network node is roaming to or located in the at least one second network comprises at least one of:

an identification of the first network, an identification of the at least one network slice, at least one roaming related parameter of the at least one network slice, an identification of the at least one roaming UE for which the admission control is performed, a proposed roaming budget of the at least one roaming related parameter, at least one of statistical or expected behaviors of the at least one roaming UE at the first network, an indication of a change in the at least one roaming related parameter, at least one of an indication to update or an indication to obtain the at least one roaming budget of at least one roaming related parameter, or an indication to perform the admission control for the at least one network slice.

4. The first network node according to claim 1, wherein, when the requested admission control of the at least one roaming UE for the at least one network slice is accepted by the second network node, the first response from the second network node comprises at least one of:

an identification of the second network, an identification of the at least one network slice, an identification of the at least one roaming UE for which the admission control is performed, at least one roaming related parameter of the at least one network slice, or a new allocated roaming budget of at least one roaming related parameter.

5. The first network node according to claim 1, wherein the one or more memories store the programming instructions for execution by the at least one processor to:

receive a subscription request from the second network node, wherein the subscription request indicates at least one subscription event;

monitor the at least one subscription event; and determine whether to send a notification of the subscription request to the second network node.

6. The first network node according to claim 5, wherein the subscription request indicates at least one of:

an identification of a second network operator of the second network, an identification of the at least one network slice, an identification of the at least one roaming UE for which the admission control is performed, at least one roaming related parameter of the at least one network slice to be checked, a threshold of a roaming budget of the at least one roaming related parameter, an identification for a subscription, at least one of a subscription event for the roaming budget (RB) adjustment or negotiation or a subscription event for a status of RB of at least one roaming related parameter of the at least one network slice, subscription event reporting information based on at least one of a periodicity, an event, or a threshold, or a behavior of the at least one roaming UE at the first network.

7. The first network node according to claim 5, wherein the one or more memories store the programming instructions for execution by the at least one processor to:

send the notification of the subscription request to the second network node based on the monitored at least one subscription event in the first network, wherein the notification comprises one or more of the following:

an identification related to the at least one subscription event, time information related to the at least one subscription event, an identification of the first network, an identification of the at least one network slice, at least one roaming related parameter of the at least one network slice, an identification of the at least one roaming UE for which the admission control is performed, a notification message of an event with or without a proposed roaming budget of the at least one roaming related parameter based on event reporting information in the subscription request, or a notification message of an event with a current status of RB of at least one roaming related parameter of the at least one network slice based on the event reporting information in the subscription request.

8. The first network node according to claim 1, wherein the one or more memories store the programming instructions for execution by the at least one processor to:

receive a second request from the second network node while the first network node is roaming to or located in the at least one second network, wherein the second request is indicative of the proposed adjustment of at least one of the at least one roaming budget or a new allocated roaming budget of the at least one roaming related parameter; and send a second response to the second network node, wherein the second response indicates one or more of the following:

whether the first network node accepts or rejects the proposed adjustment of at least one roaming budget;

a new proposed adjustment of at least one roaming budget of at least one roaming related parameter; or whether the first network node accepts or rejects the new allocated roaming budget of the at least one roaming related parameter of the at least one network slice.

9. The first network node according to claim 8, wherein the one or more memories store the programming instructions for execution by the at least one processor to:

obtain a roaming budget of the at least one roaming related parameter based on at least one of the first response or the second request from the second network entity node; and configure the roaming budget of the at least one roaming related parameter to a network function of the first network that is responsible for performing the admission control.

10. The first network node according to claim 1, wherein each of the at least one network slice is associated with a set of roaming related parameters, and wherein the set of roaming related parameters comprise at least one of:

a maximum number of allowed registered roaming UEs from the second network in the network slice of the first network, a maximum number of allowed packet data unit (PDU) sessions for roaming UEs from the second network in the network slice of the first network, at least one of a maximum or minimum number of allowed PDU sessions for each roaming UE from the second network in the network slice of the first network, at least one of a maximum or minimum number of allowed registered terminals for each roaming UE from the second network in the network slice of the first network, or a minimum uplink or download throughput for at least one roaming UE from the second network in the network slice of the first network.

11. The first network node according to claim 1, wherein the one or more memories store the programming instructions for execution by the at least one processor to:

receive a configuration message from the second network node, wherein the configuration message comprises one or more of the following:

an identification of the second network, an identification of the at least one network slice, an identification of the at least one roaming UE for which the admission control is performed, or an initial roaming budget of the at least one roaming related parameter of the at least one network slice.

12. A method performed by a first network node in a first network for admission control of at least one roaming user equipment (UE) for at least one network slice, wherein each of the at least one network slice is associated with at least one roaming budget allocated to roaming UEs from at least one second network, wherein the first network or the at least one second network is a mobile communication network, and wherein the method comprises:

sending a first request to a second network node while the first network node is roaming to or located in the at least one second network, wherein the first request indicates one or more of the following:

a proposed adjustment of the at least one roaming budget of at least one roaming related parameter;

a request for a new budget of the at least one roaming budget of at least one roaming related parameter; or a request for the admission control of the at least one roaming UE for the at least one network slice;

receiving a first response from the second network node, wherein the first response indicates one or more of the following:

whether the second network node accepts or rejects the proposed adjustment of the at least one roaming budget;

a new allocated roaming budget of at least one roaming related parameter; or whether the second network node accepts or rejects the requested admission control of the at least one roaming UE for the at least one network slice; and wherein the method comprises:

receiving a subscription request from the second network node, wherein the subscription request indicates at least one subscription event;

monitor the at least one subscription event; and determine whether to send a notification of the subscription request to the second network node.

13. The method according to claim 12, wherein the method comprises:

monitoring at least one of network data or UE data indicating a status of at least one of a network or UE related to the at least one roaming budget; and determining whether to send the first request to the second network node while the first network node is roaming to or located in the at least one second network based on at least one of the network data or the UE data.

14. The method according to claim 13, wherein at least one of the monitored network data or UE data indicates at least one of:

a remaining roaming budget of at least one roaming related parameter of the at least one network slice for the roaming UEs from the second network, a remaining total budget, including a remaining roaming budget of at least one roaming related parameter of the at least one network slice for the roaming UEs from the second network, and a remaining non-roaming budget of the same parameter for non-roaming UEs from the first network, at least one of statistical or expected behaviors of the roaming UEs in the admission control for the at least one network slice at the first network, at least one of statistical or expected behaviors of non-roaming UEs in the admission control for the at least one network slice at the first network, or information indicating that at least one roaming UE request requires network slice admission control check.

15. The method according to claim 12, wherein the subscription request indicates at least one of:

an identification of a second network operator of the second network, an identification of the at least one network slice, an identification of the at least one roaming UE for which the admission control is performed, at least one roaming related parameter of the at least one network slice to be checked, a threshold of a roaming budget of the at least one roaming related parameter, an identification for a subscription, at least one of a subscription event for the roaming budget (RB) adjustment or negotiation or a subscription event for a status of RB of at least one roaming related parameter of the at least one network slice, subscription event reporting information based on at least one of a periodicity, an event, or a threshold, or a behavior of the at least one roaming UE at the first network.

16. The method according to claim 12, wherein method comprises:

send the notification of the subscription request to the second network node based on the monitored at least one subscription event in the first network, wherein the notification comprises one or more of the following:

an identification related to the at least one subscription event, time information related to the at least one subscription event, an identification of the first network, an identification of the at least one network slice, at least one roaming related parameter of the at least one network slice, an identification of the at least one roaming UE for which the admission control is performed, a notification message of an event with or without a proposed roaming budget of the at least one roaming related parameter based on event reporting information in the subscription request, or a notification message of an event with a current status of RB of at least one roaming related parameter of the at least one network slice based on the event reporting information in the subscription request.

17. A non-transitory computer-readable medium storing computer instructions, that when executed by one or more hardware processors, cause the one or more hardware processors to perform operations comprising:

sending a first request to a second network node while a first network node is roaming to or located in at least one second network, wherein the first request comprises one or more of the following:

a request for a proposed adjustment of at least one roaming budget of at least one roaming related parameter;

a request for a new budget of the at least one roaming budget of at least one roaming related parameter; or a request for an admission control of at least one roaming user equipment (UE) for at least one network slice;

receiving a first response from the second network node, wherein the first response indicates one or more of the following:

whether the second network node accepts or rejects the proposed adjustment of the at least one roaming budget;

a new allocated roaming budget of at least one roaming related parameter; or whether the second network node accepts or rejects the requested admission control of the at least one roaming UE for the at least one network slice;

wherein the operations comprise:

monitoring at least one of network data or UE data indicating a status of at least one of a network or UE related to the at least one roaming budget; and determining whether to send the first request to the second network node while the first network node is roaming to or located in the at least one second network based on at least one of the network data or the UE data; and wherein the operations comprise:

receiving a subscription request from the second network node, wherein the subscription request indicates at least one subscription event;

monitoring the at least one subscription event; and determining whether to send a notification of the subscription request to the second network node.

18. The non-transitory computer-readable medium according to claim 17, wherein at least one of the monitored network data or UE data indicates at least one of:

a remaining roaming budget of at least one roaming related parameter of the at least one network slice for the roaming UEs from the second network, a remaining total budget, including a remaining roaming budget of at least one roaming related parameter of the at least one network slice for the roaming UEs from the second network, and a remaining non-roaming budget of the same parameter for non-roaming UEs from a first network, at least one of statistical or expected behaviors of the roaming UEs in the admission control for the at least one network slice at the first network, at least one of statistical or expected behaviors of non-roaming UEs in the admission control for the at least one network slice at the first network, or information indicating that at least one roaming UE request requires network slice admission control check.

19. The non-transitory computer-readable medium according to claim 17, wherein the subscription request indicates at least one of:

an identification of a second network operator of the second network, an identification of the at least one network slice, an identification of the at least one roaming UE for which the admission control is performed, at least one roaming related parameter of the at least one network slice to be checked, a threshold of a roaming budget of the at least one roaming related parameter, an identification for a subscription, at least one of a subscription event for the roaming budget (RB) adjustment or negotiation or a subscription event for a status of RB of at least one roaming related parameter of the at least one network slice, subscription event reporting information based on at least one of a periodicity, an event, or a threshold, or a behavior of the at least one roaming UE at a first network.

* * * * *